(12) United States Patent
Shanks et al.

(10) Patent No.: US 11,372,126 B2
(45) Date of Patent: Jun. 28, 2022

(54) LARGE VOLUME HOLOGRAPHIC IMAGING SYSTEMS AND ASSOCIATED METHODS

(71) Applicant: The Johns Hopkins University, Baltimore, MD (US)

(72) Inventors: Wayne E. Shanks, Pasadena, MD (US); Christina M. Selby, Glenwood, MD (US); Matthew N. Giarra, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 312 days.

(21) Appl. No.: 16/839,599

(22) Filed: Apr. 3, 2020

(65) Prior Publication Data
US 2020/0319591 A1      Oct. 8, 2020

Related U.S. Application Data

(60) Provisional application No. 62/829,710, filed on Apr. 5, 2019, provisional application No. 62/829,150, filed on Apr. 4, 2019.

(51) Int. Cl.
*G01V 3/12*      (2006.01)
*G01S 13/04*    (2006.01)
(Continued)

(52) U.S. Cl.
CPC ............... *G01V 3/12* (2013.01); *G01S 13/04* (2013.01); *G01S 13/89* (2013.01); *G02B 5/32* (2013.01);
(Continued)

(58) Field of Classification Search
None
See application file for complete search history.

(56) References Cited

U.S. PATENT DOCUMENTS

| 3,947,630 A | 3/1976 | Javan |
| 7,170,440 B1 | 1/2007 | Beckner |

(Continued)

FOREIGN PATENT DOCUMENTS

| CN | 104170388 A | * | 11/2014 | ........... H04N 19/136 |
| CN | 108779907 A | * | 11/2018 | ............... G02B 5/32 |
| WO | WO-2007124116 A2 | * | 11/2007 | ......... G06K 17/0022 |

OTHER PUBLICATIONS

Harmer et al., "Determination of the complex permittivity of textiles and leather in the 14-40 GHz millimeter-wave band using a free-wave transmittance only method," Microwaves, Antennas & Propagation, IET, vol. 2, No. 6 pp. 606-614, 2008.

(Continued)

*Primary Examiner* — Mohammed Rachedine
(74) *Attorney, Agent, or Firm* — Todd Farnsworth

(57) ABSTRACT

A method for large volume holographic imaging is provided that may include determining projection operators within sub-volumes of a decomposed target volume, and determining a point aggregation operator for each sub-volume based on the projection operators. The method may further include receiving holographic field measurement data set captured for the target volume via the sensor array, generating a sub-volume interest value for each sub-volume by applying the holographic field measurement data set to each point aggregation operator, determining a sub-volume with a highest sub-volume interest value, and determining respective lower-tier sub-volume interest values for lower-tier sub-volumes of the sub-volume with the highest sub-volume interest value. The lower-tier sub-volumes may be defined by decomposing the sub-volume with the highest sub-volume interest value. Additionally, the method may include generating an image of the target volume based on the lower-tier sub-volume interest values.

20 Claims, 14 Drawing Sheets

(51) Int. Cl.

| | | |
|---|---|---|
| *G01S 13/89* | (2006.01) | |
| *G02B 5/32* | (2006.01) | |
| *G03H 1/02* | (2006.01) | |
| *G03H 1/28* | (2006.01) | |
| *G06T 7/00* | (2017.01) | |
| *G01S 13/88* | (2006.01) | |
| *G03H 1/00* | (2006.01) | |
| *G01S 13/87* | (2006.01) | |
| *G03H 1/04* | (2006.01) | |
| *G03H 5/00* | (2006.01) | |

(52) U.S. Cl.
CPC ............. *G03H 1/0248* (2013.01); *G03H 1/28* (2013.01); *G06T 7/0004* (2013.01); *G01S 13/887* (2013.01); *G03H 2001/0033* (2013.01)

(56) References Cited

U.S. PATENT DOCUMENTS

| | | |
|---|---|---|
| 7,324,042 B2 | 1/2008 | Werntz |
| 7,391,362 B2 | 6/2008 | Beckner |
| 7,969,281 B2 | 6/2011 | Kofman |
| 9,568,594 B2 | 2/2017 | Harash |
| 10,037,671 B2 | 7/2018 | Zack |
| 10,127,412 B2 | 11/2018 | Sadr |
| 10,191,145 B2 | 1/2019 | Swanson |
| 10,249,950 B1 | 4/2019 | Arnitz |
| 10,416,288 B2 | 9/2019 | Swanson |
| 10,621,847 B2 | 4/2020 | Zack |
| 10,656,263 B2 | 5/2020 | Weissman |
| 10,816,658 B2 | 10/2020 | Frizzell |
| 2002/0008656 A1 | 1/2002 | Landt |
| 2003/0058155 A1 | 3/2003 | Landt |
| 2007/0109179 A1* | 5/2007 | Werntz .................. G01S 13/904 342/25 R |
| 2007/0132630 A1 | 6/2007 | Beckner |
| 2008/0068173 A1 | 3/2008 | Alexis |
| 2009/0213012 A1* | 8/2009 | Jiang .................... H01Q 9/0407 343/700 MS |
| 2009/0231104 A1 | 9/2009 | Kofman |
| 2009/0273509 A1 | 11/2009 | Fullerton |
| 2014/0285324 A1* | 9/2014 | Austin .................... G01S 13/84 340/10.3 |
| 2014/0329172 A1* | 11/2014 | Hart ........................ G03H 1/04 355/2 |
| 2016/0377704 A1 | 12/2016 | Harash |
| 2016/0379462 A1 | 12/2016 | Zack |
| 2018/0067204 A1 | 3/2018 | Frizzell |
| 2018/0210077 A1 | 7/2018 | Jones |
| 2018/0330593 A1 | 11/2018 | Zack |
| 2019/0310372 A1 | 10/2019 | Crouch |
| 2020/0266877 A1 | 8/2020 | Keller |
| 2020/0290513 A1* | 9/2020 | Karafin .................... G03H 3/00 |
| 2020/0319331 A1 | 10/2020 | Sheen |
| 2020/0319364 A1 | 10/2020 | Shanks |
| 2020/0320731 A1 | 10/2020 | Sheen |
| 2020/0401082 A1* | 12/2020 | Blodgett .............. G02B 21/365 |

OTHER PUBLICATIONS

Janssen, "Short range propagation measurements at 2.4, 4.5, and 11.5 GHz in indoor and outdoor environments," Technical report, Netherlands organization for applied scientific research, May 1992.

Yang, "Development of a Real-time Ultra-wideband See Through Wall Imaging Radar System," PhD diss., University of Tennessee, 2008.

Lockwood et al., "Optimizing the radiation pattern of sparse periodic two-dimensional arrays," IEEE Trans. Ultrason., Ferroelect., Freq. Control, vol. 43, No. 1, pp. 15-19, Jan. 1996.

Ahmed et al., "Near field mm-wave imaging with multistatic sparse 2Darrays," Eur. Radar Conf., Rome, Italy, 2009, pp. 180-183.

Sheen et al., "Three-dimensional millimeter-wave imaging for concealed weapon detection," IEEE Trans. Microw. Theory Tech., vol. 49, No. 9, pp. 1581-1592, Sep. 2001.

Ahmed at al., "Fully electronic E-band personnel imager of 2 M 2 aperture based on a multistatic architecture," IEEE Trans. Microw. Theory Tech., vol. 61, No. 1, pp. 651-657, 2013.

Meagher, "Octree encoding: A new technique for the representation, the manipulation, and display of arbitrary 3-d objects by computer" Technical Report IPL-TR-80-111, Image Processing Laboratory, Rensselaer Polytechnic Institute, Troy, New York, Oct. 1980.

Samet, "An Overview of quadtree, octrees and related hierarchical data structures", Theoretical Foundations of Computer Graphics and CAD, NATO ASI Series, vol. F40, 1988.

* cited by examiner

LARGE VOLUME HOLOGRAPHIC IMAGING SYSTEMS AND ASSOCIATED METHODS

CROSS-REFERENCE TO RELATED APPLICATIONS

This application claims the benefit of U.S. Provisional Application No. 62/829,150 filed on Apr. 4, 2019, the entire contents of which are hereby incorporated herein by reference, and this application claims the benefit of U.S. Provisional Application No. 62/829,710 filed on Apr. 5, 2019, the entire contents of which are hereby incorporated herein by reference.

TECHNICAL FIELD

Exemplary embodiments generally relate to imaging technologies, and more specifically relate to holographic imaging technologies.

BACKGROUND

Imaging systems have become increasingly useful, particularly in the context of security screening. Such systems are often able to penetrate exterior barriers (e.g., exterior of a suit case or clothing) to reveal information about the internal features or objects that are visibly concealed.

In some instances, imaging systems may leverage, for example, radio waves that reflect off metals and other materials and can therefore be used for imaging purposes. However, such conventional systems are useful in relatively small volume environments and often cannot be leveraged for use, for example, to image or scan a relatively large volumes, such as an entryway of a stadium, that may have large crowds of passing individuals. Further, many conventional systems that leverage radio frequency imaging or scanning, even of small volumes, require complex, high computing power processing that can be expensive to construct and to operate. As such, as need exists to develop more efficient and lower-cost imaging systems that include capabilities to scan or image relatively large volumes, for example, for security screening and other purposes.

BRIEF SUMMARY OF SOME EXAMPLES

An example method for large volume holographic imaging is provided in accordance with some example embodiments. In this regard, the method may comprise decomposing, by processing circuitry, a target volume into a plurality of sub-volumes, and determining, by the processing circuitry, projection operators for points within each sub-volume based on an architecture of a sensor array and a spatial relationship of the sensor array to the target volume. Further, the method may comprise determining, by the processing circuitry, a point aggregation operator for each sub-volume. In this regard, the point aggregation operator may be an aggregation of the projection operators associated with a respective sub-volume. The method may also comprise receiving, by the processing circuitry, holographic field measurement data captured for the target volume via the sensor array, generating, by the processing circuitry, a sub-volume interest value for each sub-volume by applying the holographic field measurement data to each point aggregation operator, determining, by the processing circuitry, a sub-volume with a highest sub-volume interest value, and determining, by the processing circuitry, respective lower-tier sub-volume interest values for lower-tier sub-volumes of the sub-volume with the highest sub-volume interest value. In this regard, the lower-tier sub-volumes may be defined by decomposing the sub-volume with the highest sub-volume interest value. Further, the method may comprise generating, by the processing circuitry, an image of the target volume based on the lower-tier sub-volume interest values.

Additionally, an example apparatus for large volume holographic imaging is provided. In this regard, the apparatus may comprise processing circuitry configured to decompose a target volume into a plurality of sub-volumes, determine projection operators for points within each sub-volume based on an architecture of a sensor array and a spatial relationship of the sensor array to the target volume, and determine a point aggregation operator for each sub-volume. In this regard, each point aggregation operator may be an aggregation of the projection operators associated with a respective sub-volume. Additionally, the processing circuitry may also be configured to receive holographic field measurement data captured for the target volume via the sensor array, generate a sub-volume interest value for each sub-volume by applying the holographic field measurement data to each point aggregation operator, determine a sub-volume with a highest sub-volume interest value, and determine respective lower-tier sub-volume interest values for lower-tier sub-volumes of the sub-volume with the highest sub-volume interest value. In this regard, the lower-tier sub-volumes may be defined by decomposing the sub-volume with the highest sub-volume interest value. The processing circuitry may also be configured to generate an image of the target volume based on the lower-tier sub-volume interest values.

According to some example embodiments, a holography imaging system is provided that comprises a holography sensor and processing circuitry. The holography sensor may comprise a sensor array, and the holography sensor may be configured to capture holographic field measurement data of a target volume. The processing circuitry may configured to decompose a target volume into a plurality of sub-volumes, determine projection operators for points within each sub-volume based on an architecture of a sensor array and a spatial relationship of the sensor array to the target volume, and determine a point aggregation operator for each sub-volume. In this regard, each point aggregation operator may be an aggregation of the projection operators associated with a respective sub-volume. Additionally, the processing circuitry may also be configured to receive holographic field measurement data captured for the target volume via the sensor array, generate a sub-volume interest value for each sub-volume by applying the holographic field measurement data to each point aggregation operator, determine a sub-volume with a highest sub-volume interest value, and determine respective lower-tier sub-volume interest values for lower-tier sub-volumes of the sub-volume with the highest sub-volume interest value. In this regard, the lower-tier sub-volumes may be defined by decomposing the sub-volume with the highest sub-volume interest value. The processing circuitry may also be configured to generate an image of the target volume based on the lower-tier sub-volume interest values.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
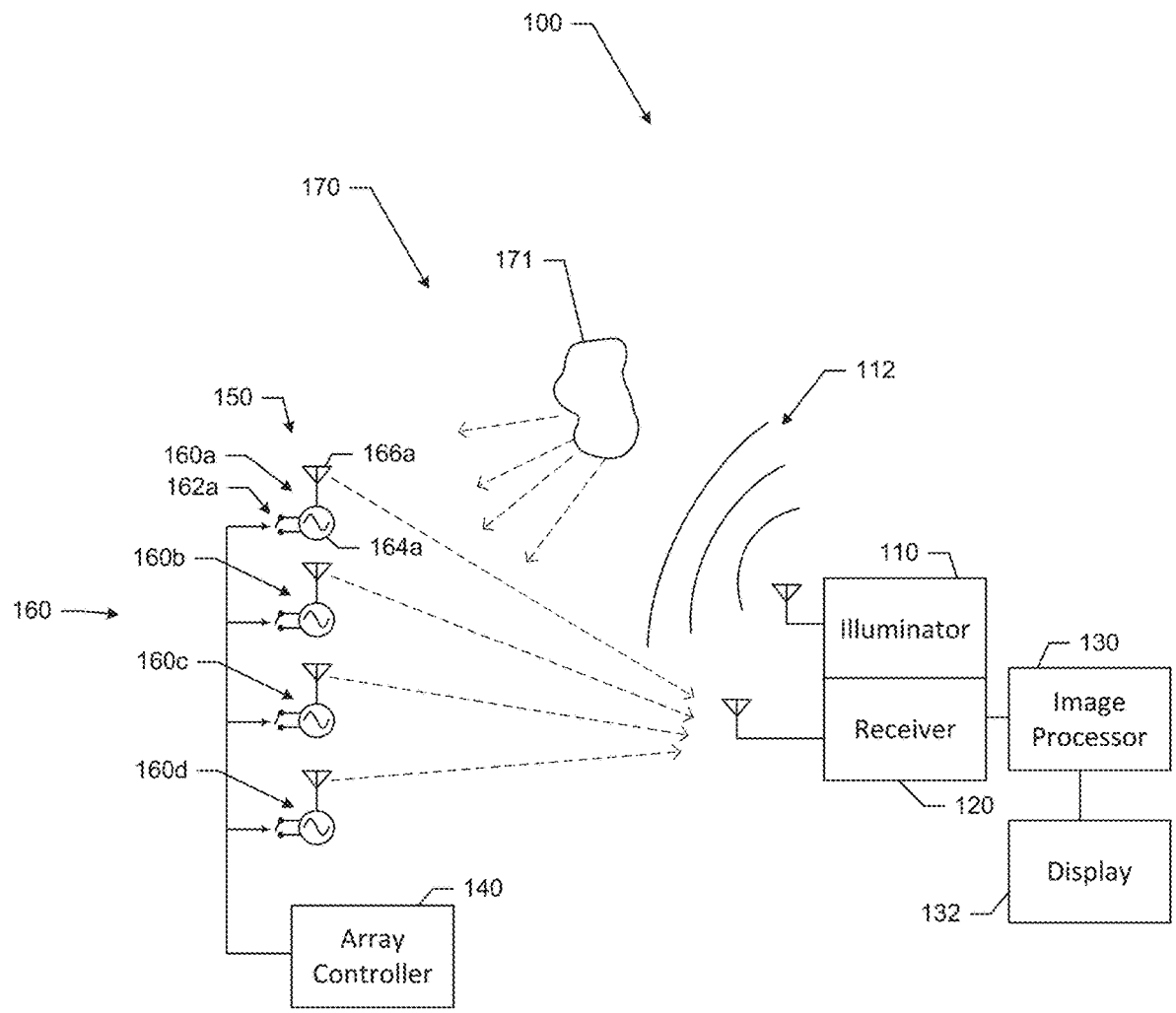
FIG. 1 illustrates an example holography sensor system according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

As used herein, the terms "component," "module," and the like are intended to include a computer-related entity, such as but not limited to hardware, firmware, or a combination of hardware and software. For example, a component or module may be, but is not limited to being, a process running on a processor, a processor, an object, an executable, a thread of execution, and/or a computer. By way of example, both an application running on a computing device and/or the computing device can be a component or module.

One or more components or modules can reside within a process and/or thread of execution and a component/module may be localized on one computer and/or distributed between two or more computers. In addition, these components can execute from various computer readable media having various data structures stored thereon. The components may communicate by way of local and/or remote processes such as in accordance with a signal having one or more data packets, such as data from one component/module interacting with another component/module in a local system, distributed system, and/or across a network such as the Internet with other systems by way of the signal. Each respective component/module may perform one or more functions that will be described in greater detail herein. However, it should be appreciated that although this example is described in terms of separate modules corresponding to various functions performed, some examples may not necessarily utilize modular architectures for employment of the respective different functions. Thus, for example, code may be shared between different modules, or the processing circuitry itself may be configured to perform all of the functions described as being associated with the components/modules described herein. Furthermore, in the context of this disclosure, the term "module" should not be understood as a nonce word to identify any generic means for performing functionalities of the respective modules. Instead, the term "module" should be understood to be a modular component that is specifically configured in, or can be operably coupled to, the processing circuitry to modify the behavior and/or capability of the processing circuitry based on the hardware and/or software that is added to or otherwise operably coupled to the processing circuitry to configure the processing circuitry accordingly.

According to various example embodiments, systems, apparatuses, and methods are provided to holographically image a large space or volume (i.e., a target volume), such as an ingress or egress that individuals pass through, using a system comprising a holography sensor. The target volume may be, for example, many square meters in size. According to some example embodiments, the holography sensor may include a transmitter, or illuminator, that illuminates the objects within the target volume. Radio waves reflect off of the illuminated objects, and are received at a holographic backscatter array. The holographic backscatter array may include a plurality of backscatter elements (e.g., radio frequency resonators). According to some example embodiments, the backscatter elements may be rapidly switched on (activated) and off (deactivated) by a modulation signal. When activated, the backscatter elements can be excited by the incident radio wave front (e.g., the reflected illumination signal), and will re-radiate or backscatter the radio waves of the illuminator signal as backscatter signals. When deactivated, the backscatter elements may output little to no radio waves. As the backscatter elements rapidly switch between the activated and deactivated states, the reflected signal provided by a backscatter element over time is amplitude modulated (AM). In this regard, a signal at frequency Fc that is AM modulated with a signal at frequency Fm, may therefore be converted to a new signal that contains energy at the sum (Fc+Fm) and differences (Fc−Fm) of the signal and modulation frequencies. In this way, modulating the backscatter signals of the backscatter elements, shifts the backscatter signal frequencies from the backscatter elements away from the illuminating signal frequency, allowing a central radio receiver to isolate the backscatter signals that came from actively modulating backscatter elements. According to some example embodiments, one or more backscatter elements may be active and modulating at any given time while the other backscatter elements may be deactivated. As such, the source of the backscatter signal at any given time can be known and the relationship between the position of the source and data derived from the reflected backscatter signal can be used to generate a holographic image of objects within the target volume. In this regard, the backscatter signal from the active backscatter element may be received by a receiver, converted into data, and aggregated with other data captured in association with other backscatter elements of the array. The aggregated data set may be referred to as a holographic field measurement data set, and may be analyzed to generate a three-dimensional (3D) representation of the contents of the target volume.

Because the holographic field measurement data set may include phase and amplitude data, as well as position information for the active backscatter element, the aggregated data may provide information about the target volume that can be oriented to the physical world in a manner that penetrates through visible barriers (e.g., cloth, plastic, etc) to reveal the presence of metal or other dielectric materials in the target volume that may otherwise be visibly concealed. As such, because, for example, radio frequency signals are used, the generated 3D image or representation of the target volume may be used to identify image features of an object within the target volume that may be visibly concealed. Such image features may be used in a variety of ways. For example, according to some example embodiments, the image features may be rendered on a display to be viewed by security personnel. Additionally or alternatively, the image features may be compared with a feature database to identify a match with a suspicious object. In response, to, for example, identifying a match, an alert may be generated for security screening personnel indicating that an action should be taken.

According to some example embodiments, a process of efficiently locating data of interest within the holographic field measurement data set may also be performed using, for example, an octree decomposition approach. In this regard, the target volume may be decomposed or divided into sub-volumes (e.g., eight top tier sub-volumes) and back projection operators determined for points within the sub-volumes may be aggregated to generate point aggregation operators for each sub-volume. Lower tier sub-volumes may also be defined and point aggregation operators for those lower-tier sub-volumes may be determined.

Beginning at the top tier sub-volumes, the holographic field measurement data set may be applied to the point aggregation operators for each sub-volume to determine a sub-volume interest value for each sub-volume. The sub-volumes may then be further analyzed in order based on the magnitude of the sub-volume interest values. In this regard, the sub-volume with the highest sub-volume interest value may be further decomposed and lower-tier point aggregation operators may be determined for the lower-tier sub-volumes of the top-tier sub-volume with the highest sub-volume interest value. The sub-volumes may continue to be decomposed until a minimum sub-volume size is reached. Subsequently, the top-tier sub-volume with the second highest sub-volume interest value may be analyzed in the same manner, and so on until all sub-volumes have been analyzed or, for example, a timer expires that allows sufficient time for high interest sub-volumes to be analyzed. Based on the sub-volume interest values, an image may be generated, as further described below.

According to some example embodiments, an image may be rendered based on the holographic field measurement data set on a display to be viewed by, for example, security personnel, and, according to some example embodiments, an alert may be generated based on the image for security screening personnel indicating that an action (e.g., an investigative action) should be taken.

The example embodiments of holography sensor systems, apparatuses, and methods that are introduced herein may be implemented in the context of a security screening system for large, crowded venues, such as stadiums events, and air and rail transportation hubs. Example embodiments described herein can offer high-speed scanning or imaging of large crowds at venues, thereby overcoming the limitation of many conventional imaging systems that are unsuitable for such large crowd applications because such system use slow (approximately 5 to 10 second), single person scanning techniques and often require the individual to pose in certain position for optimal scanning. Also, such conventional systems often use millimeter wavelength technology that can require expensive components. Via some example embodiments described herein, relatively large volume spaces can be scanned in three dimensions using radio frequency signals to support holographic imaging for security screening.

Although example embodiments described herein could be used at various frequencies, such as higher frequencies and shorter wavelengths including millimeter wavelengths, some example embodiments may take advantage of the benefits of operation at frequencies having, for example, centimeter wavelengths. Example frequencies that may be used include, but are not limited to, 2.6 GHz signals having about an 11.5 centimeter wavelength, 5.8 GHz having about a 5.2 centimeter wavelength, signals between 5 to 6 GHz, or the like. At such wavelengths, the concealment of a 10 centimeter metal or dielectric object within a crowd of individuals can be imaged using the example holography sensor systems described herein. Further, for example, 2.6 GHz signals may be used to generate a holographic image may have a resolution of about 5 centimeters, and the signals may easily penetrate clothes and be scattered by both metals and dielectrics.

Also, because components operating at centimeter wavelengths are used in many other common contexts, (e.g., Wi-Fi, GPS, cellular phones, etc.), the components are more readily available and less expensive allowing some example embodiments of the holography sensor systems to be both affordable and effective. Additionally, certain centimeter wavelength operation can be performed in an unlicensed frequency band (e.g., within the 5.8 GHz Industrial Scientific and Medical (ISM) band), which can also reduce cost and increase adoption of the technology. In this regard, the international ISM radio bands offer a 150 MHz wide license free band at 5.8 GHz. Additionally, in the United States, a 600 MHz license-free band for radiolocation exists from 5.25 to 5.85 GHz.

Also, because free space propagation loss for electromagnetic waves increases proportionally with wavelength, an effective range for holographic imaging at a 5 centimeter wavelength can be 10 times farther than that of a conventional 5 millimeter wavelength system. For this reason, such conventional 5 millimeter wavelength systems cannot provide sufficient range for use in large volume contexts, such as for an entryway at a stadium. Some systems that operate at 5 millimeter wavelengths can suffer from higher atmospheric absorption. While laboratory microwave imaging systems can show good performance by operating over an extended bandwidth, practical deployment may require operation within narrowly, allotted bands. As such, according to some example embodiments as described herein, a holography sensor system may employ centimeter wavelength signals, which can reduce system cost, increase the screening range, and increase visual barrier penetration to better detect hidden threats in dense, unstructured crowds of individuals, in near-real time, while also being non-invasive to personal privacy.

Further, according to some example embodiments, a prioritization process (or divide and conquer approach) described herein may operate to improve computing technology by arriving at the generation of an image (e.g., a three dimensional image) of the target volume at a faster-speed by requiring less processing. The process, according to some example embodiments, may divide the large target volume into a multiresolution, three-dimensional grid that is analyzed from low to high resolution (e.g., from larger sub-volumes to smaller sub-volumes) prioritizing volumes that include the most data of interest first in the analysis to generate an image. Accordingly, computing resources may be concentrated on volumes of interest that include, for example, moving people and suspicious objects. Analyzing the target volume from low resolution to high resolution, also allows for consideration of multiple bounce (or reflection) scattering of signals, which can be incorporated into the holographic reconstruction of the target volume, thereby enabling an ability to holographically image large, crowded, highly scattering environments.

Having described aspects of some example embodiments in general terms, FIG. 1 illustrates an example holography sensor system 100, according to some example embodiments. The holography sensor system 100 may comprise an illuminator 110, a receiver 120, an image processor 130, an array controller 140, and a backscatter array 150. The holography sensor system 100 may be configured to perform radio frequency holographic imaging of a target volume 170. Various stationary and moving objects may be disposed within the target volume 170. In this regard, the target volume 170 may be, for example, a personnel corridor or passageway through which individuals gain access to or depart from a venue (e.g., a stadium, a retail store, a mass transit station, a school, or the like). The object 171 is representative of an example object that may be present within the target volume 170.

The illuminator 110 may be a radio frequency device with a local oscillator that permits the illuminator 110 to output an illumination signal 112 at a desired radio frequency (e.g., 2.6 GHz, 5.8 GHz, or the like) via an antenna. According to some example embodiments, the illuminator 110 may be an interrogator device, such as an RFID interrogator device. According to some example embodiments, the illumination signal 112 may have a wavelength between about 1 centimeter to about 15 centimeters. In this regard, the illuminator 110 may comprise a radio (e.g., a hardware or software defined radio, or a hybrid thereof) and other supporting hardware for generating and controlling the output of the illumination signal 112. The illuminator 110 may be configured to continuously output the illumination signal 112 or the illuminator 110 may be configured to selectively output the illumination signal 112 (e.g., periodically or based on a control input). The illuminator 110 may be placed at a location where the illumination signal 112 provides sufficient illumination for interaction with objects within the target volume 170. As such, according to some example embodiments, the illumination signal 112 may be required to have a least a threshold power level at any location within the target volume 170.

The receiver 120 may be configured to receive backscatter signals from the backscatter array 150. In this regard, the receiver 120 may comprise a radio (e.g., a hardware or software defined radio, or a hybrid thereof) and other supporting hardware for receiving and controlling receipt of backscatter signals from the backscatter elements 160 (e.g., backscatter element 160a-160d). According to some example embodiments, the receiver 120 may be a receiver portion of an RFID reader device. As such, the receiver 120 may comprise an antenna and radio frequency components configured to convert the received wireless signals into data indicative of the received wireless signals. In this regard, for example, the receiver 120 may be configured to receive a wireless signal and generate data indicative of amplitude and phase information associated with the received wireless signal. The receiver 120 may include components that attenuate or block the frequency of the illumination signal 112, to permit the receiver 120 to generate data based on amplitude modulated sidebands from the backscatter signals from the backscatter array 150. In this regard, the receiver 120 may include a filter that may include or be embodied as a high-pass filter that attenuates signals at the frequency of the illumination signal 112 to remove the illumination signal 112 from the generated data. According to some example embodiments, the amplitude and phase information from the backscatter signals provided by the backscatter array 150 may be extracted from the sidebands.

According to some example embodiments, the illuminator 110 and the receiver 120 may operate as a single unit. In this regard, according to some example embodiments, the illuminator 110 and receiver 120 may share a radio (e.g., which may be a hardware defined, software defined, or hybrid radio) and a local oscillator. According to some example embodiments, the radio may be configured for coherent operation between transmit and receive channels. In this regard, the illuminator 110 and the receiver 120 may be combined to form a reader device that is configured to both output the illumination signal 112 (which may also be referred to as an interrogation signal) and receive responsive signals from backscatter elements of the backscatter array 150. The use of a common local oscillator may allow for coherent measurements of the backscatter signals, for example, without requiring a loop-back calibration techniques. Further, with respect to physical implementation, the illuminator 110 or the receiver 120, together or separately, may be installed, for example, in an overhead physical position, such as on a ceiling above the target volume 170.

The backscatter array 150 may comprise a plurality of backscatter elements 160 (e.g., backscatter element 160a-160d), and may be, for example, installed along a border or borders of the target volume 170, or even at locations within the target volume 170. In this regard, the backscatter array 150 may be installed into (or onto) one or more of a ceiling, floor, wall, structural column, or the like. As such, the size of the backscatter array 150 may be, for example, many feet long by many feet wide (e.g., 6 feet by 8 feet). The backscatter array 150 need not be planar and placement of the backscatter elements need not be uniform as long as the physical position of the backscatter elements 160 within the space is known and the power level of the illumination signal 112 at the location of the backscatter element 160 is sufficient (e.g., above a power level threshold). The backscatter elements 160 may be referred to as backscatter signal emitters or backscatter tags. The backscatter elements 160 may be configured to receive the illumination signal 112 and provide a responsive backscatter signal for receipt by the receiver 120. The backscatter signal may be a function of the illumination signal 112, and since the illumination signal 112 may be impacted by objects within the target volume 170, the backscatter signal may include information about the content of the target volume 170 based on the effect on the illumination signal 112 as received by the backscatter elements 160. In other words, information in a backscatter signal, such as relative amplitude and phase, can be inferred to have been present in the illumination signal 112 received at the backscatter element 160.

While the example backscatter array 150 of FIG. 1 shows four backscatter elements 160, according to some example embodiments, any number of backscatter elements 160 (e.g., hundreds, thousands, millions, etc.) may be included in a backscatter array 150. Further, the backscatter array 150 may be representative of separate backscatter arrays that may be separately operated in a coordinated fashion. As such, the backscatter array 150, and thus, the holography sensor system 100 may be scalable for a variety of applications and different spaces. The backscatter elements 160 may be formed in, for example, a grid pattern across the array 150. According to some example embodiments, the backscatter elements 160 may be formed or operated as a sparse array and, in some example embodiments, a multi-static array. For example, according to some example embodiments, only some of the grid positions (e.g., formed by a pattern or psuedorandomly selected) within the array 150 may be populated with a backscatter element 160. Accordingly to some example embodiments, each position within the grid may be populated with a backscatter element 160, and the array 150 may be operated, as further described below, as a sparse array by activating one or more of the backscatter elements 160 at any given time.

Backscatter element 160a may be representative of each of the backscatter elements 160b-160d, which may have a similar construction. In this regard, the backscatter element 160a may comprise resonant circuitry 164a and an antenna 166a. According to some example embodiments, the resonant circuitry 164a may be configured to receive a signal at a resonant frequency of the circuitry 164a (e.g., the illumination signal 112) and provide a responsive backscatter signal, to the antenna 166a, that is based on the received signal and a modulation signal that is provided to the resonant circuitry 164a. According to some example embodiments, the resonant circuitry 164a may comprise a chip with a memory that is configured to control the operation of the backscatter element 160a. According to some example embodiments, the backscatter element 160a may not include a local power source, such as a battery and may therefore be a passively operated device powered by the energy of the illumination signal 112.

The antenna 166a may be operably coupled to the resonant circuitry 164a and may be formed as, for example, a dipole or a coil antenna. According to some example embodiments, the antenna 166a may etched or otherwise formed on an inlay substrate in a manner similar to an RFID tag. The backscatter element 160a may also comprise a control switch 162a. The control switch 162a may be configured to transition the backscatter element 160a between an activated state or a deactivated state. In this regard, in the activated state, the backscatter element 160a may be configured to receive the illumination signal 112 and transmit a responsive backscatter signal that is based on the illumination signal 112 that has interacted with the target volume and a modulation signal. In the deactivated state, the backscatter element 160a may be inactive such that the backscatter element 160a is configured to not provide a responsive backscatter signal in response to the illumination signal 112. According to some example embodiments, the control switch 162a may be a component of the resonant circuitry 164a that, for example, may control the operation of the resonant circuitry 164a and therefore the operation of the backscatter element 160a. As such, the state of the control switch 162a may determine whether the backscatter element 160a is in the active state or the inactive state. However, according to some example embodiments, as further described below, when the backscatter element 160a is in the active state, the backscatter element 160a may be subjected to a modulation signal (e.g., from the array controller 140) that changes the state of the control switch 162a to incorporate, for example, amplitude modulation into the backscatter signal of the activated backscatter element 160a. As such, according to some example embodiments, when the backscatter element 160a is in the active state, the control switch 162a may be controlled to toggle between the switch states (on or off) based on the modulation signal. When the backscatter element 160a is deactivated, the control switch 162a may be maintained in a single state (e.g., off) for the duration of the time that the backscatter element 160 is deactivated. According to some example embodiments, the control switch 162a may be attached to the antenna 166a and operation of the control switch 162a may short circuit or open circuit the antenna 166a for deactivation. According to some example embodiments, the control switch 162a may be a transistor, for example, within a chip of the resonant circuitry 164a.

The array controller 140 may be configured to control the operation of the backscatter array 150 and, more specifically, the backscatter elements 160 via the respective control switches (e.g., control switch 162a) of the backscatter elements 160. The array controller 140 may include logic for activating or deactivating various ones of the backscatter elements 160. The array controller 140 may be configured to activate one or more of the backscatter elements 160. In an example scenario, backscatter element 160a may be the single activated backscatter element. As such, according to some example embodiments, backscatter elements 160b-160d may be deactivated. In this regard, if other backscatter elements 160 were selected and activated, those backscatter elements 160 may be controlled to operate in the same manner as the backscatter element 160a. The backscatter element 160a may be active for a time slot or a set duration of time that is allocated to the backscatter element 160a, such that backscatter signals generated during the time slot are known to have been generated by the backscatter element 160a and its known position relative to the target volume 170 and the antenna of the receiver 120. When the time slot ends, the array controller 140 may be configured to select one or more other backscatter elements 160 to activate, e.g., backscatter element 160b for the subsequent time slot. During this subsequent time slot, according to some example embodiments, all other backscatter elements 160 (i.e., other than the selected backscatter element or elements) may be deactivated so that it is known that any backscatter signals during the subsequent time slot originated from the selected backscatter elements including backscatter element 160b. As such, according to some example embodiments, the array controller 140 may operate to activate only one of the backscatter elements 160 at a given time.

According to some example embodiments, sets (e.g., more than one) of backscatter elements 160 may be selected and activated during a given time slot, while the unselected backscatter elements 160 are deactivated. With each subsequent time slot, a different set of backscatter elements 160 may be selected and activated, while the other backscatter elements 160 are deactivated. With each subsequent time slot, data from different sets of the backscatter elements 160 can be generated and gathered. Because the activated backscatter elements 160 for each time slot is known, the gathered or aggregated data can be considered holistically, by the image processor 130 as described below, to be able to, for example, isolate data from a specific backscatter element 160 for use in back projection or other techniques.

As such, according to some example embodiments, the one or more backscatter elements 160 that have been selected, for example, by the array controller 140, may be activated at any given time, with the identity (e.g., identification value, location, or the like) of the activated backscatter elements 160 being known. Activation of a selected backscatter element 160 may be performed by via the use of a selection signal provided by the array controller 140 to selected backscatter elements 160. According to some example embodiments, the array controller 140 may provide the selection signal to the selected backscatter elements to activate the selected back scatter elements. According to some example embodiments, the selection signal may include a modulated signal that may be used by the selected backscatter elements 160 to control the operation of the respective control switches (e.g., control switch 162a). The modulation signal may formed as a sine wave, square wave, or the like and have a frequency of, for example, in kHz or MHz ranges. Additionally, according to some example embodiments, a frequency of the modulation signal may be selected based on the frequency of the illumination signal 112 to facilitate the generation of the backscatter signals as side bands to the illumination signal 112 for interference avoidance. In this regard, use of such a modulation signal may operate to modulate the field of backscatter elements 160 causing generation of amplitude modulated sidebands to the frequency of the illuminator signal 112. As such, the backscatter signal provided by a selected backscatter element 160 may be amplitude modulated by mixing with the modulation signal. In this regard, as mentioned above, a signal at frequency Fc that is AM modulated with a signal at frequency Fm, may therefore be converted to a new signal that contains energy at the sum (Fc+Fm) and differences (Fc−Fm) of the signal and modulation frequencies. In this way, the backscatter signal is modulated and shifted in frequency away from the illumination signal 112, allowing the receiver 120 to isolate the backscatter signals that came from the active backscatter elements 160. Accordingly, the array controller 140 may be configured to activate a selected backscatter element by providing a modulation signal the selected backscatter element for use in generating the backscatter signal According to some example embodiments, the array controller 140 may be configured to provide the selection signal to the backscatter array 150 and more specifically the backscatter elements 160 in a variety of different ways. In this regard, according to some example embodiments, the array controller 140 may be electrically connected (e.g., via wiring) to each of the backscatter elements 160 to provide the selection signal to the selected backscatter elements 160. Alternatively, according to some example embodiments, the selection signal may be provided via a wireless communication. According to some example embodiments, the selection signal may be separated into components. For example, according to some example embodiments, the selection signal may comprise a first component that communicates the selection of the backscatter elements 160 and a second component that indicates the modulation signal to be used in generating the backscatter signal.

Alternatively, according to some example embodiments, the selection signal may be provided optically for addressing the backscatter elements 160. In this regard, each backscatter elements 160 may comprise a respect optical sensor that is configured to receive an optical selection signal and, based on the optical selection signal, transition the respective backscatter element 160 to an activated state. In this regard, if no optical selection signal is received (or if a deactivation optical selection signal is received), then the respective backscatter element 160 may transition to a deactivated state. As such, the array controller 140 may, for example, comprise a steerable laser or the like for transmitting the optical selection signal to the optical sensors of the backscatter elements 160. In this regard, array controller 140 may be configured to provide the optical signal in the form of a scanning light beam (e.g., laser), a spatial light modulation, a light projection (e.g., a liquid crystal display (LCD) projection), or the like.

According to some example embodiments, the array controller 140 may control the selection of the active backscatter elements 160 (or rather the next backscatter elements 160 to activate) in a number of different ways. The array controller 140 may comprise, for example, a switching network (e.g., in the form of a multiplexer board) for addressing each of the backscatter elements 160 within the backscatter array 150. In this regard, for example, the array controller 140 may be configured to activate the backscatter elements 160, via the selection signal, in a repeated, sequential order (e.g., in a specific sequential pattern, such as, a serpentine or other pattern) across the array 150. Alternatively, according to some example embodiments, the array controller 140 may provide the selection signal to activate backscatter elements 160 in a pseudorandom manner. Additionally, the array controller 140 may be in communication with the image processor 130, according to some example embodiments, to permit the array controller 140 to communicate the backscatter element selection information (e.g., selected backscatter elements for each time slot) to the image processor 130 for use in later analysis. According to some example embodiments, the array controller 140 may be controlled by the image processor 130 and, for example, may be a multiplexed switching device that is controlled by the image processor 130. According to some example embodiments, the backscatter elements 160 may be controlled by the array controller 140 in accordance with the selection signal, which may comprise, as mentioned above, a modulation frequency, which may be in the kHz or MHz range. Accordingly, by activating backscatter elements 160 across the array 150, a radio frequency wave front of data about the target volume 170 can be gathered, as further described herein.

The image processor 130 may be configured to receive backscatter data from the receiver 120 and aggregate the data to generate a collection of data for the target volume 170. The image processor 130 may comprise, for example, a processing unit to support the operation of the image processor 130 and the processing unit may be, for example, a graphic processing unit (GPU) configured to perform the operations of the image processor 130 described herein. The image processor 130 may be configured to receive the backscatter data and generate the collection of data as a holographic field measurement data set. Since, according to some example embodiments, the image processor 130 may receive the backscatter element selection information from the array controller 140, the image processor 130 may link the backscatter element 160 to the respective backscatter data based on the timing of receipt of the backscatter signal associated with the backscatter data. As such, the backscatter data may be linked to the particular backscatter element 160

(and its position) that generated the respective backscatter signal. Additionally, according to some example embodiments, the modulated sidebands of the backscatter signals received by the receiver 120 from the activated backscatter elements 160, and provided to the image processor 130, may include information that can be extracted by inferring a relative amplitude and phase of a representative un-modulated wave front incident at the backscatter array 150.

As further, described below, the image processor 130 may be configured to analyze the holographic field measurement data set to determine the contents of the target volume 170. In this regard, the image processor 130 may be configured to generate a representation (e.g., a 3D representation) of the target volume 170 based on the holographic field measurement data set. Such a representation may be an image based on the data provided by backscatter signals from the backscatter elements 160.

Using the holographic field measurement data set, according to some example embodiments, image features within the image may be identified within the target volume 170. Since the holographic field measurement data set is based on radio frequency signals (e.g., centimeter wavelength signals), the holographic field measurement data set may include information indicative of the presence of metal and dielectrics within the target volume 170. Such information may be converted into an image with visual features for presentation, for example, on the display 132, to security personnel or automatically analyzed against a database of shapes to identify matches with items of interest (e.g., large metal objects, incendiary devices, guns, knives, or the like). Because the array controller 140 may select and activate different backscatter elements 160 at a relatively rapid rate (e.g., kHz, MHz, etc.), data about the target volume 170 may be captured and analyzed quickly, thereby enabling, for example, video frame rates and near-real time video imaging of the target volume 170 and concealed objects within the target volume 170 for presentation to a user, for example, on the display 132.

According to some example embodiments, any technique for converting the holographic field measurement data set into an image may be used. For example, various back projection techniques may be used such as a Huygens and Fresnel type back-projection imaging algorithms for holographic imaging as provided in Yang, Yunqiang, "Development of a Real-time Ultra-wideband See Through Wall Imaging Radar System." PhD diss., University of Tennessee, 2008; D. M. Sheen, D. L. McMakin, T. E. Hall, "Three-dimensional millimeter-wave imaging for concealed weapon detection", IEEE Trans. Microw. Theory Tech., vol. 49, no. 9, pp. 1581-1592, September 2001; and S. S. Ahmed, A. Genghammer, A. Schiessl, L.-P. Schmidt, "Fully electronic E-band personnel imager of 2 M 2 aperture based on a multistatic architecture", IEEE Trans. Microw. Theory Tech., vol. 61, no. 1, pp. 651-657, 2013, each of which are incorporated by reference in their entirety. Additionally, as further described herein, the image processor 130 may be configured to process the holographic field measurement data set by prioritizing portions of the target volume 170 that are likely to have interesting data (e.g., potential objects of interest) to improve the operation of the processing circuitry and reduce the computing resources needed to efficiently generate an image at video frame rates (e.g., 25 frames per second) in near-real time. Such a prioritization approach may be particularly useful, or even necessary, in example embodiments where the holographic field measurement data set is based on backscatter signals originating from, for example, millions of backscatter elements 160.

While the illuminator 110, receiver 120, image processor 130, and array controller 140 have been described as separate entities that may be positioned separately from each other, according to some example embodiments, some or all of the illuminator 110, receiver 120, image processor 130, and array controller 140 may be co-located and reliant upon shared components that support the operation of each co-located entity. As mentioned above, the illuminator 110 and the receiver 120 may be formed as a single entity. Similarly, according to some example embodiments, the image processor 130 and the array controller 140 may be co-located and supported, for example by common processing devices or processing circuitry. According to some example embodiments, the illuminator 110, the receiver 120, the backscatter array 150, and the array controller 140 may form a holography sensor. Additionally, as mentioned above, the holography sensor system 100 and the holography sensor may be scalable, such that a number of backscatter arrays 150 can be used in a common system. Such a system may include illuminators 110 and receivers 120, for example, for each backscatter array 150, and each of the receiver 120 may transmit backscatter data, for example, to one or more image processors 130 for analysis to generate a holographic image of the target volume 170.

Having described some example components and associated functionalities of the holography sensor system 100, a description of the overall operation of the holography sensor system 100, according to some example embodiments, may now be provided. In this regard, the illuminator 110 may output the illumination signal 112 in the target volume 170. The illumination signal 112 may be affected by the presence of the object 171 within the target volume 170, and the illumination signal 112 may therefore be scattered by the object 171 thereby imparting information about the target volume 170 into the illumination signal 112 that is ultimately received by a backscatter element 160. In this regard, scattered illumination signal 112 may be received by an active backscatter element 160, i.e., backscatter element 160a of the backscatter array 150. The backscatter element 160a may be activated via a selection signal, for example, comprising a modulation signal, provided by the array controller 140, and the array controller 140 may also deactivate the other, unselected backscatter elements 160 for a time slot. According to some example embodiments, a duration of the time slot may be determined based on, for example, processing speeds of the components of the holographic sensor system 100 to permit sufficient time for the backscatter signals to be transmitted to the receiver 120 and stored as backscatter data. The backscatter element 160a (as well as any other selected backscatter elements 160) may transmit a responsive backscatter signal for receipt by the receiver 120. The receiver 120 may convert the received backscatter signal into backscatter data for provision to the image processor 130 and linked to the backscatter element 160a based on the time slot.

The array controller 140 may make another selection of one or more backscatter elements 160, for example, backscatter element 160c, and backscatter element 160c may be activated, while all other backscatter elements 160 may be deactivated for a subsequent time slot. Accordingly, the backscatter element 160c may transmit a responsive backscatter signal for receipt by the receiver 120. The receiver 120 may convert the received backscatter signal into backscatter data for provision to the image processor 130 and linked to the backscatter element 160c based on the subsequent time slot.

The array controller 140 may be continue to select backscatter elements 160 and the image processor 130 may continue to collect associated backscatter data to generate a holographic field measurement data set for the target volume 170. In this regard, for example, many thousands or even millions of backscatter elements 160 may be selected and activated to output respective backscatter signals. The backscatter data generated from the backscatter signals may be collected to form the holographic field measurement data set. Because the backscatter signals from the backscatter elements 160 include information about the target volume 170 and the object 171 due to the effect on the illumination signal 112 received by the backscatter element 160, an image of the target volume 170 can be generated based on the holographic field measurement data set. In this regard, because the physical placement of the of the backscatter elements 160 and the antenna of the receiver 120 are known, the information within the backscatter signals (e.g., amplitude and phase) can be interpreted using, for example, back projection imaging techniques, in view of these known parameters to generate the image of the target volume 170. The image may include features that may be associated with objects within the target volume 170, and, therefore the image features may be indicative of items of interest within the target volume 170, such as the object 171. For example, as mentioned above, an image with image features may be presented to security personnel to trigger an investigation if a suspicious object is identified.

Figure 2:
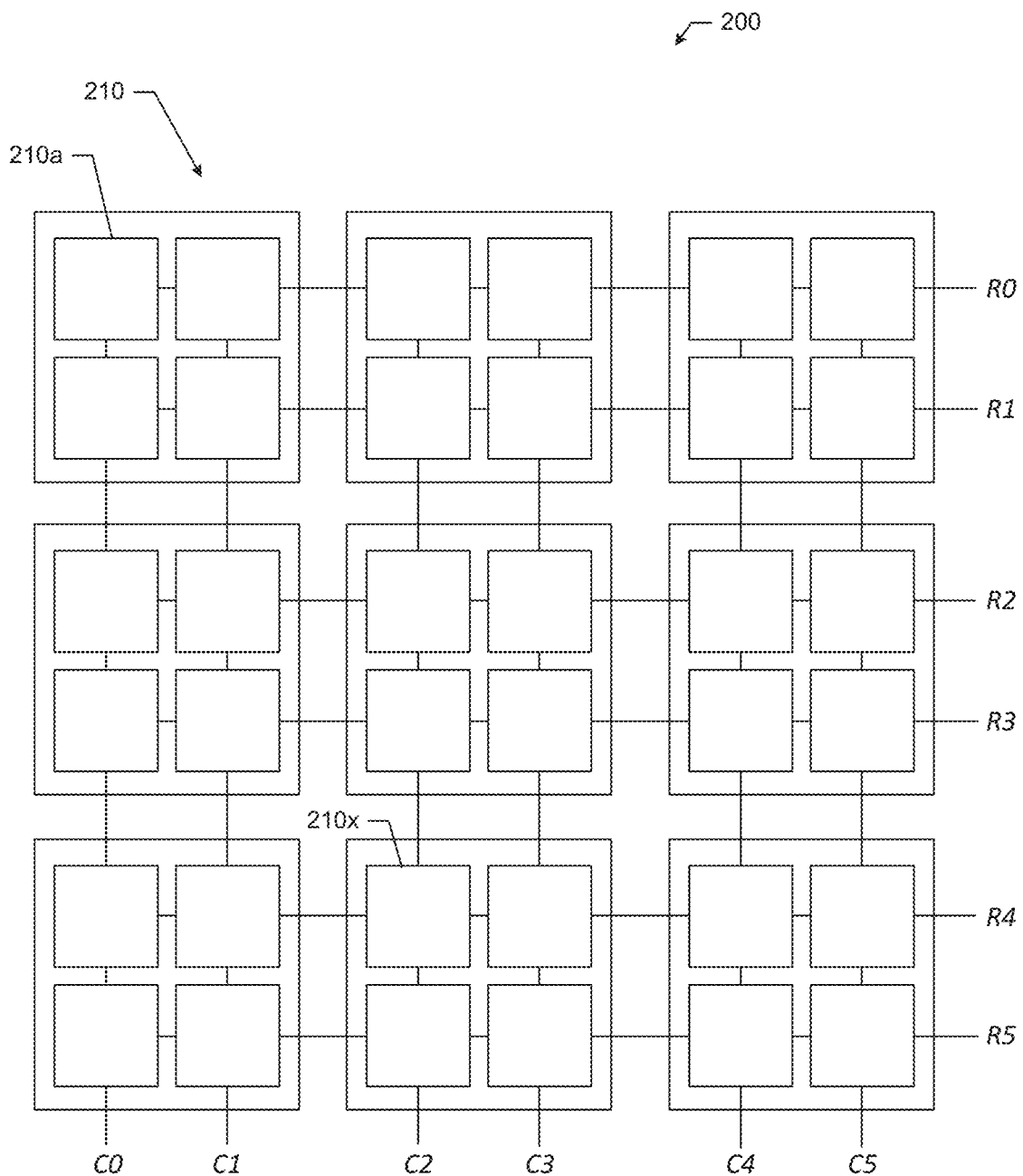
FIG. 2 illustrates an example backscatter array according to some example embodiments.

Now referring to FIG. 2, an example backscatter array 200 is shown, in accordance with some example embodiments. In operation, the backscatter array 200 may operate similar to the backscatter array 150, however, the backscatter array 200 may use a column and row connectivity structure for addressing the backscatter elements.

In this regard, the backscatter array 200 may comprise a plurality of backscatter elements 210, including the backscatter elements 210*a* and 210*x*. In the example embodiment shown in FIG. 200, the backscatter array 200 has 36 backscatter elements 210. Each backscatter element 210 may operate in the same manner as described above with respect to the backscatter elements 160. The backscatter elements 210 may be grouped, for example, onto panels that each have four backscatter elements 210. Due to the column and row connectivity structure, activation of one or more backscatter elements 210 may be performed by controlling signals on two inputs. In this regard, the selection signal provided by the array controller 140 may be provided, for example, as two signals. In this regard, each of the backscatter elements 210 may comprise logic circuitry that requires a respective row and column input to be true (e.g., high voltage) for a particular backscatter element 210 to be active as described above, and the other backscatter elements 210 may be inactive due to the other inputs being false (e.g., low voltage).

The column selection lines C0 to C5 may be inputs of the backscatter array 200 to select a column, and the row selection lines R0 to R5 may be inputs to select a row. As such, according to some example embodiments, the column selection lines and the row selection lines may be operably coupled to the array controller 140 to perform selection and activation of a backscatter element 210. In this regard, to activate the backscatter element 210*a*, the array controller 140 may apply a high voltage signal (true) on column selection line C0 and row selection line R0 to activate backscatter element 210*a*, and all other column selection lines and row selection lines may be provided low voltage signal (false) to deactivate all other backscatter elements 210. As another example, to activate the backscatter element 210*x*, the array controller 140 may apply a high voltage signal (true) on column selection line C2 and row selection line R4 to activate backscatter element 210*a*, and all other column selection lines and row selection lines may be provided low voltage signal (false) to deactivate all other backscatter elements 210.

Additionally, according to some example embodiments, the modulation signal may be applied, for example, as the row or column signal for selecting a backscatter elements 210. In this regard, the modulation of the modulation signal may be imparted to the backscatter element 210 via the selection line (e.g., either the row or the column). A second signal may be applied to the appropriate row or column to make a selection of a backscatter elements 210, while also providing the modulation signal.

Figure 3:
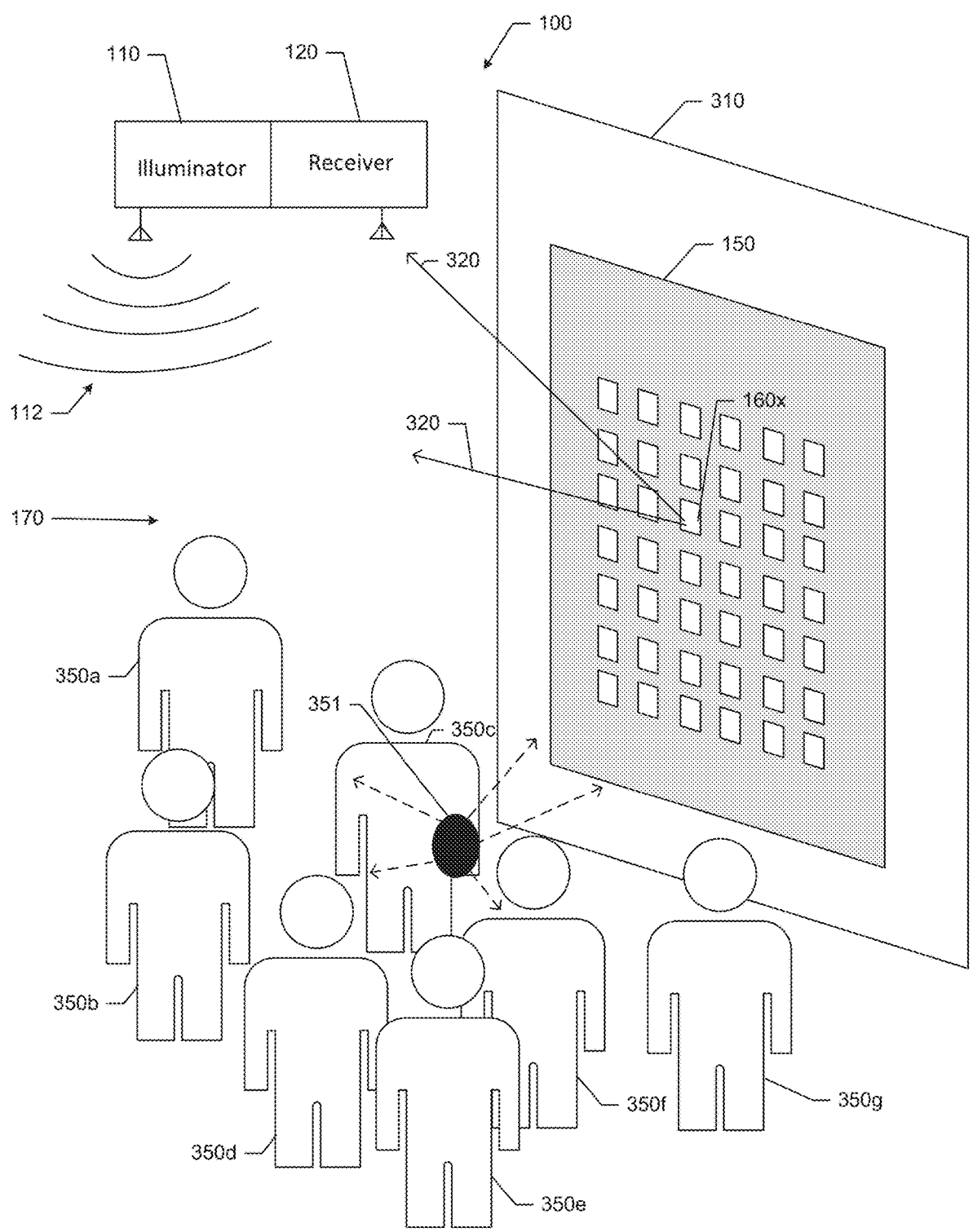
FIG. 3 illustrates an example of the holography sensor system implemented in the context of a personnel ingress or egress for a venue according to some example embodiments

To provide additional context to an example implementation of the holography sensor system 100, FIG. 3 illustrates an example of the holography sensor system 100 implemented in the context of a personnel ingress or egress for a venue, according to some example embodiments. A number of people 350, including people 350*a* to 350*g*, are shown as being located within the target volume 170. As shown in FIG. 3, the illuminator 110 and the receiver 120 may be co-located at an overhead position and such that the illumination signal 112 may fully illuminate the target volume 170. Additionally, an example embodiment of the backscatter array 150 (possibly similar to the backscatter array 200) is also shown installed on a wall 310 on a border of the target volume 170. The wall 310 may be a wall of an ingress of egress personnel corridor. The backscatter array 150 is shown as comprising a grid of backscatter elements 210, similar to the backscatter array 200.

As shown in FIG. 3, the illuminator 110 may output the illumination signal 112 into the target volume 170 and the illumination signal 112 may penetrate through, for example, the people 350 and their clothing, but be scattered by a metallic object 351 being concealed by person 350*c*. The illustration of FIG. 3 shows a time where the backscatter element 160*x* has been activated and is providing a backscatter signal 320 to the receiver 120 based on the scattered illumination signal 112 from the metallic object 351. As described further herein, the backscatter signals from the various activated backscatter elements 160 may be converted into backscatter data and aggregated to from a holographic field measurement data set that can be analyzed to generate a holographic image that includes image features of the metallic object 351 in near-near real time to, for example, alert security personnel to investigate the person 350*c* and the objects in person 350*c*'s possession.

Figure 4A:
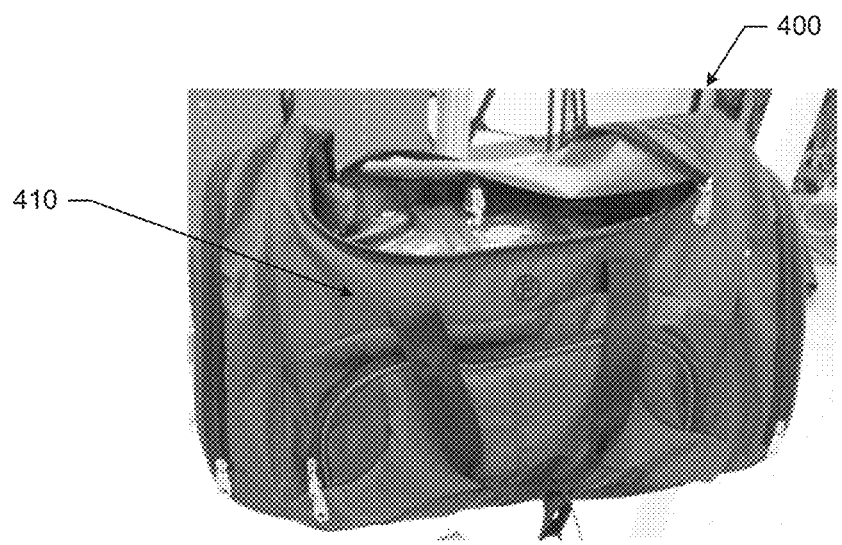
FIG. 4A illustrates a visual image of a duffle bag concealing a pressure cooker.
Figure 4B:
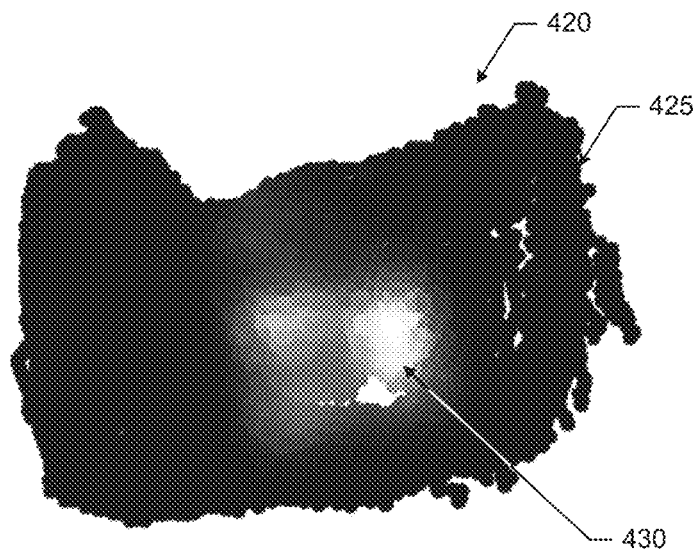
FIG. 4B illustrates a holographic image of the duffle bag concealing the pressure cooker of FIG. 4A according to some example embodiments.
Figure 4C:
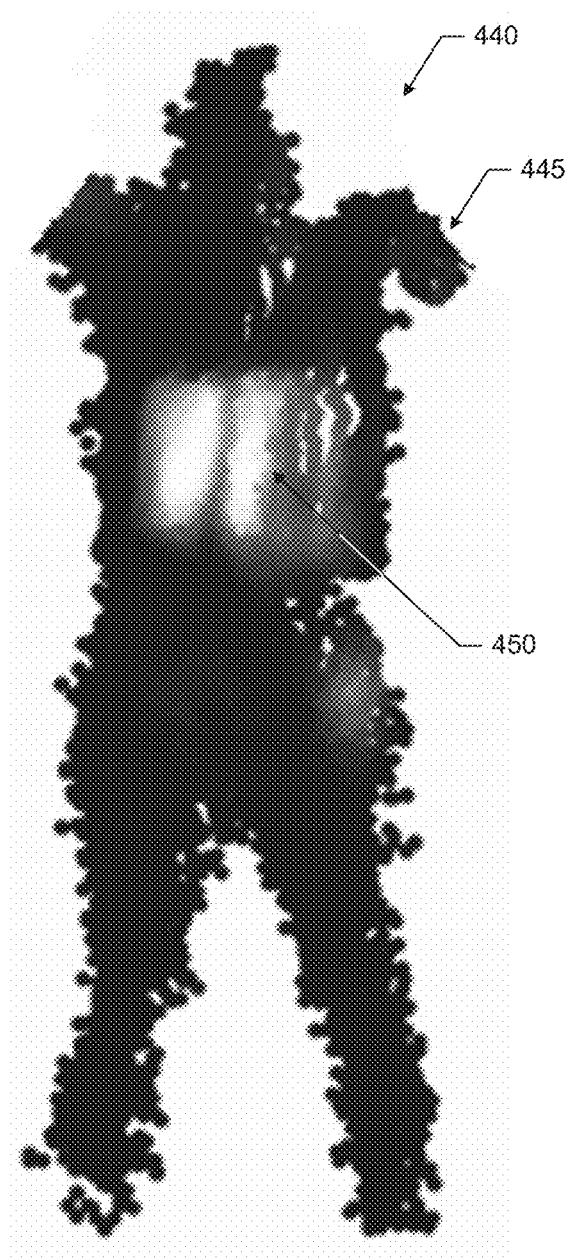
FIG. 4C illustrates a holographic image of an individual concealing a bomb vest according to some example embodiments.

In this regard, FIGS. 4A to 4C illustrate aspects relating to the rendering of a suspicious object on a display for viewing by, for example, a security personnel, in according to some example embodiments. For example, the renderings of FIGS. 4B and 4C may be based on a system utilizing centimeter wavelength signals in an example holography sensor system 100. In this regard, FIG. 4A illustrates a visual image of a duffle bag 400 with a metallic pressure cooker 410 concealed therein. The metallic pressure cooker 410 may be about a third of a cubic meter in size. The duffle bag 400 may be formed of a woven cloth material that would visibly conceal the contents of the duffle bag 400, including the metal pressure cooker 410. However, the use of radio frequency holographic imaging may penetrate through the woven cloth material of the duffle bag 400 and reveal the image features of the pressure cooker 410 disposed therein.

FIG. 4B illustrates an example rendering of a holographic image 420 of the duffle bag 400 with the metallic pressure cooker 410 disposed in the duffle bag 400. Such holographic image 420 may be rendered on, for example, a display, such as display 132 of the holography sensor system 100. As shown in FIG. 4B, the portion 425 of the holographic image 420 associated with the duffle bag 400 is rendered in black because the RF signals (i.e., the illumination signal 112) are able to penetrate through the woven cloth material of the duffle bag 400. However, the RF signals (i.e., the illumination signal 112) are scattered by the metallic pressure cooker 410 and therefore the rendering of the holographic image 420 includes a brighter area 430 that is associated with the metallic pressure cooker 410 within the duffle bag 400.

Now referring to FIG. 4C, another holographic image 440 is shown that may be generated in accordance with some example embodiments. The holographic image 440 is of an individual with a bomb vest positioned in the chest region. Again, because the RF signals (i.e., the illumination signal 112) may be of a wavelength that penetrates through a body, the portion 445 of the holographic image 440 that is rendered in black is associated with the individual. However, the RF signals (i.e., the illumination signal 112) are scattered by the bomb vest, due to the vest being constructed of metallic or other dielectric material, and therefore the rendering of the holographic image 440 includes a brighter area 450 that is associated with the bomb vest.

Figure 5:
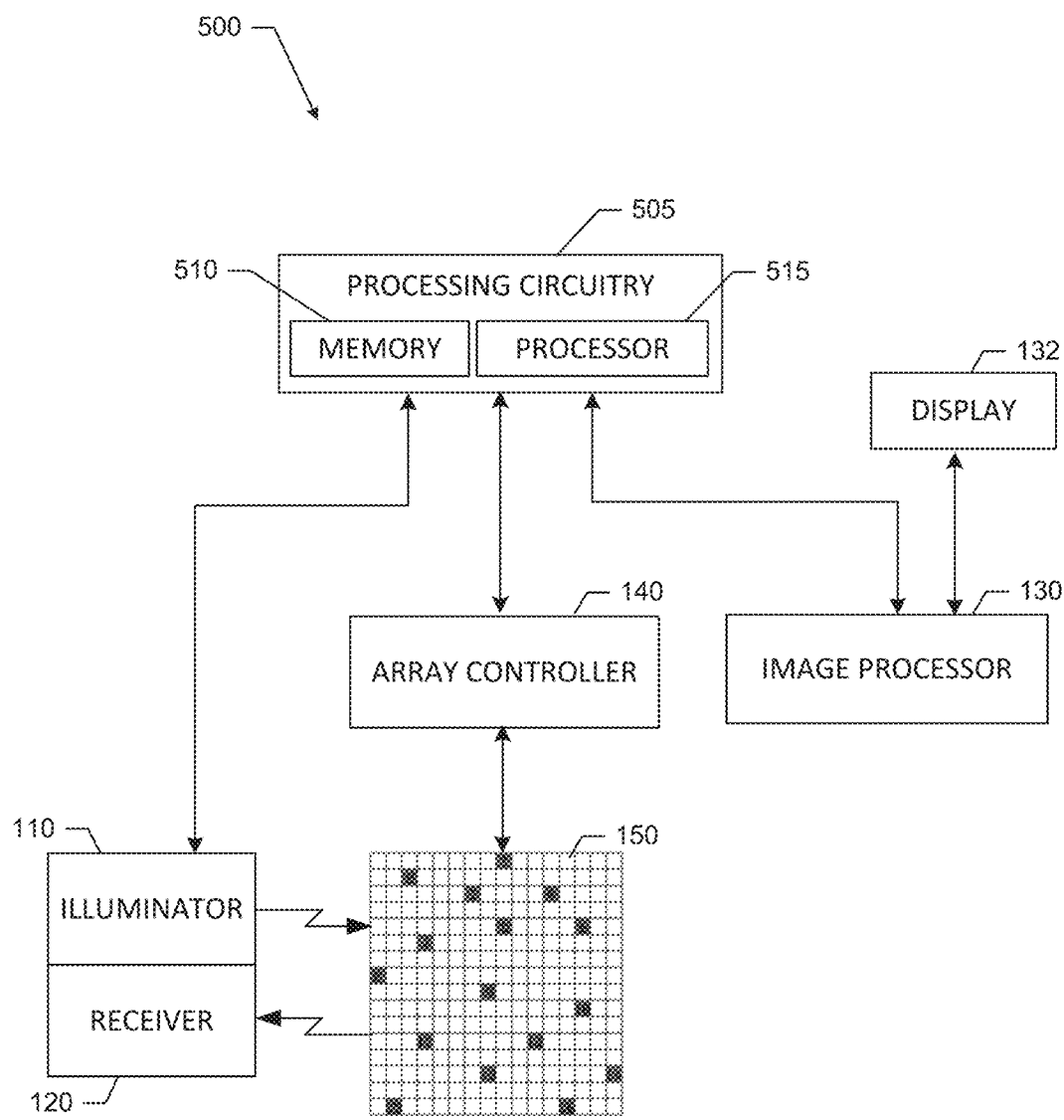
FIG. 5 illustrates a block diagram of a holographic sensor system according to some example embodiments.

Now referring to FIG. 5, a block diagram of another example embodiment of a holography sensor system 500 is provided. The holography sensor system 500 comprises elements of the holography sensor system 100 that are controlled or embodied by processing circuitry 505 to perform the functionalities of the components described herein, such as, the illuminator 110, the receiver 120, the image processor 130, and the array controller 140. The holography sensor system 500 also comprises the backscatter array 150 and the display 132. The processing circuitry 505 may be distributed amongst some or all of the components or centralized. Processing circuitry 505 may, in turn, comprise a processor 515 and a memory 510.

Further, according to some example embodiments, processing circuitry 505 may be in operative communication with or embody, the memory 510 and the processor 515. Through configuration and operation of the memory 510 and the processor 515, the processing circuitry 505 may be configurable to perform various operations as described herein, including the operations and functionalities described with respect to the illuminator 110, the receiver 120, the array controller 140, and the image processor 130. In this regard, the processing circuitry 505 may be configured to perform computational processing and memory management, user interface control, and the like to support the implementation of other functionalities. In some embodiments, the processing circuitry 505 may be embodied as a chip or chip set. In other words, the processing circuitry 505 may comprise one or more physical packages (e.g., chips) including materials, components or wires on a structural assembly (e.g., a baseboard). The processing circuitry 505 may be configured to receive inputs (e.g., via peripheral components), perform actions based on the inputs, and generate outputs (e.g., for provision to peripheral components). In an example embodiment, the processing circuitry 505 may include one or more instances of a processor 515, associated circuitry, and memory 510. As such, the processing circuitry 505 may be embodied as a circuit chip (e.g., an integrated circuit chip, such as a field programmable gate array (FPGA)) configured (e.g., with hardware, software or a combination of hardware and software) to perform operations described herein.

In an example embodiment, the memory 510 may include one or more non-transitory memory devices such as, for example, volatile or non-volatile memory that may be either fixed or removable. The memory 510 may be configured to store information, data, applications, instructions or the like for enabling, for example, the functionalities described herein. The memory 510 may operate to buffer instructions and data during operation of the processing circuitry 505 to support higher-level functionalities, and may also be configured to store instructions for execution by the processing circuitry 505. The memory 510 may also store various information including backscatter data and the holographic field measurement data set. According to some example embodiments, various data stored in the memory 510 may be generated based on other data and stored or the data may be retrieved via a communications interface and stored in the memory 510.

As mentioned above, the processing circuitry 505 may be embodied in a number of different ways. For example, the processing circuitry 505 may be embodied as various processing means such as one or more processors 515 that may be in the form of a microprocessor, graphical processing unit, or other processing element, a coprocessor, a controller or various other computing or processing devices including integrated circuits such as, for example, an ASIC (application specific integrated circuit), an FPGA, or the like. In an example embodiment, the processing circuitry 505 may be configured to execute instructions stored in the memory 510 or otherwise accessible to the processing circuitry 505. As such, whether configured by hardware or by a combination of hardware and software, the processing circuitry 505 may represent an entity (e.g., physically embodied in circuitry—in the form of processing circuitry 505) capable of performing operations according to example embodiments while configured accordingly. Thus, for example, when the processing circuitry 505 is embodied as an ASIC, FPGA, or the like, the processing circuitry 505 may be specifically configured hardware for conducting the operations described herein. Alternatively, as another example, when the processing circuitry 505 is embodied as an executor of software instructions, the instructions may specifically configure the processing circuitry 505 to perform the operations described herein.

As mentioned above, the processing circuitry 505 may be configured to perform or control the performance of the functionalities of the illuminator 110, the receiver 120, the array controller 140, and the image processor 130, as well as other functionalities described herein. In this regard, the illuminator 110 may be configured to output a illumination signal into a target volume 170. In this regard, a frequency of the illumination signal may be a radio frequency (e.g., having a centimeter wavelength). The array controller 140 may be operably coupled to the backscatter array 150 and, more specifically, the plurality of backscatter elements of the backscatter array 150, which may, for example, be positioned along a boundary of the target volume. In this regard, the array controller 140 may be configured to select a backscatter element from the plurality of backscatter elements. Further, the array controller 140 may be configured to activate the selected backscatter element to enable the selected backscatter element to transmit a backscatter signal in response to receipt of the illumination signal, and deactivate the unselected backscatter elements of the plurality of backscatter elements. Further, via the processing circuitry 505, the receiver 120 may be configured to receive the backscatter signal from the selected backscatter element.

The image processor 130, via the processing circuitry 505, may be configured to receive a transmission of the backscatter signal from the receiver 120 and convert the transmission of the backscatter signal into backscatter data. Further, the image processor 130 may be configured to aggregate the backscatter data for the selected backscatter element with data associated with other backscatter elements of the plurality of backscatter elements to form a holographic field measurement data set, and determine image features of an object within the target volume based on the holographic field measurement data set.

Further, according to some example embodiments, the array controller 140 may be configured to select the backscatter element based on a pseudorandom selection procedure. Further, the array controller 140 may be configured to activate the selected backscatter element for a first time slot and further configured to select a subsequent backscatter element for activation during a second time slot. Additionally or alternatively, the array controller 140 may be configured to activate the selected backscatter element via the row and column connection structure. Further, the receiver 120 may be configured to convert a backscatter signal into backscatter data indicative of amplitude and phase.

According to some example embodiments, the image processor 130, via the processing circuitry 505, may be configured to perform operations associated with security screening procedures. In this regard, the image processor 130 may be configured, for example, to use back projection, such as the back projection techniques described herein, to generate an image based on the holographic field measurement data set. The image may include image features indicative of an object (e.g., a metal or other dielectric object) that is located within the target volume 170. Based on a size or shape of the object, as provided by the image features, the image processor 130 may be configured to generate a security screening alert. Further, the image processor 130 may be configured to render the image or a portion of the image including the image features of the object on the display 132 to be viewed, for example, by security personnel. According to some example embodiments, the image processor 130 may be configured to track the movement of an object based on the image features of the image through repeated generation of an image of the target volume 170 in response to receipt of updated or new holographic field measurement data sets.

Figure 6:
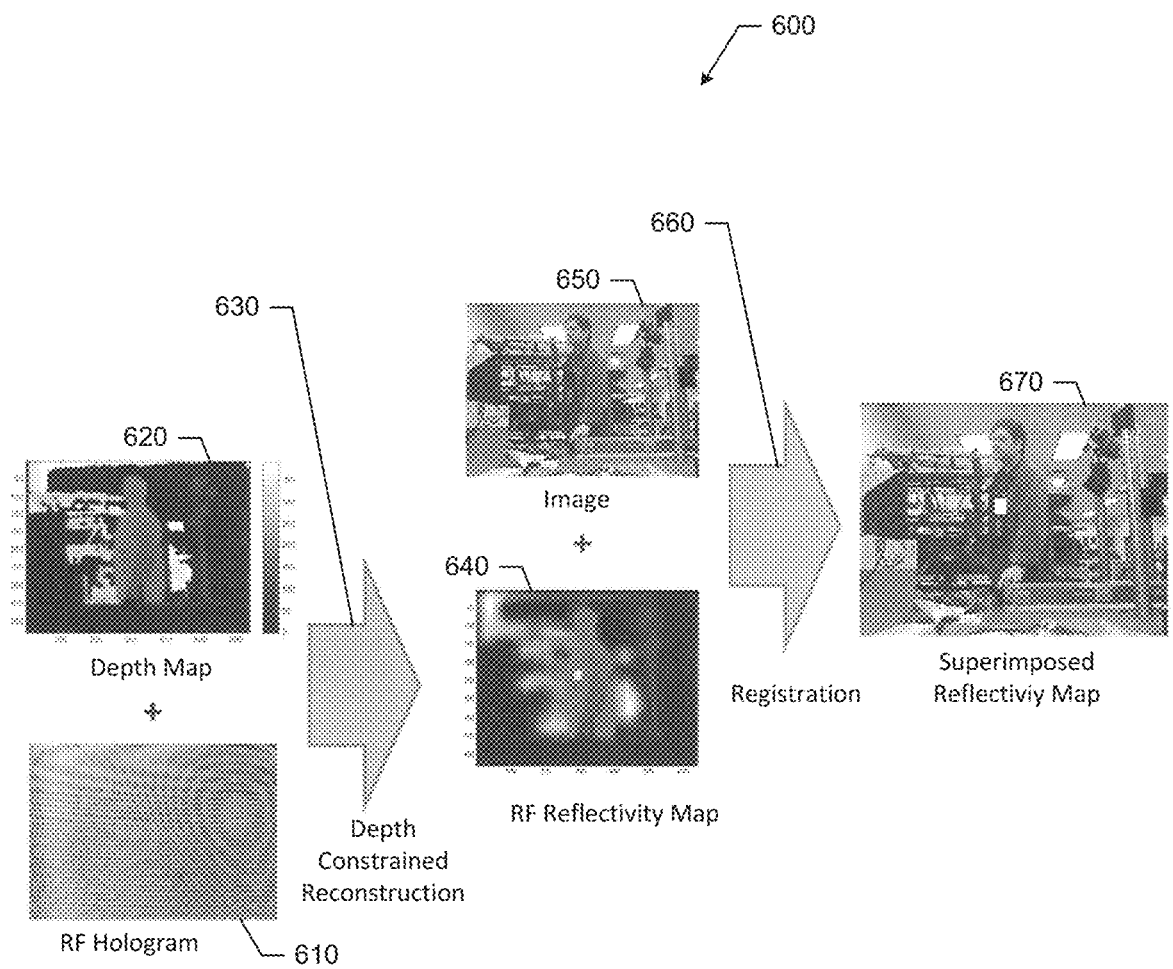
FIG. 6 illustrates a process flow for generating and rendering a combined image according to some example embodiments.

With regard to rendering a holographic image, the image processor 130 may be configured to render the holographic image by combining the holographic field measurement data set after conversion into an RF hologram with other imaging data. In this regard, with reference to FIG. 6, a process flow for generating an rendering a combined image is provided that may be performed by the image processor 130.

In this regard, the holographic field measurement data set may be converted into an RF hologram 610 via, for example, a holography technique such as back projection as described herein. Additionally, a depth map 620 of, for example, the target volume 170, may also be generated using, for example, a depth camera (such as a Microsoft Kinect™) that maps depth via structured light or time of flight measurements to generate the depth map 620. At 630, the RF hologram 610 may be combined with the depth map 620 via a depth constrained reconstruction, and, as a result, an RF reconstruction in the form of an RF reflectively map 640 may be formed. In this regard, because both the RF hologram 610 and the depth map 620 include depth or distance-based information, the RF hologram 610 and the depth map 620 may be combined based on a correlation between the depth or distance-based information. Additionally, the depth map 620 may introduce visual features into the RF reflectively map 640. The RF reflectivity map 640 may, in turn, be combined with an image of the target volume 170, captured via a camera. To do so, a registration process may be undertaken at 660 to align the RF reflectively map 640 with the image 650. The registration process may be performed based on the visual features of the RF reflectively map 640 or a priori. As a result, a superimposed reflectivity map 670 may be generated that highlights overlays the threshold-level data from the RF reflectivity map 640 on the image 650, thereby indicating, in the example shown in FIG. 6, that an item of interest may be present in the individual's shirt pocket.

Figure 7:
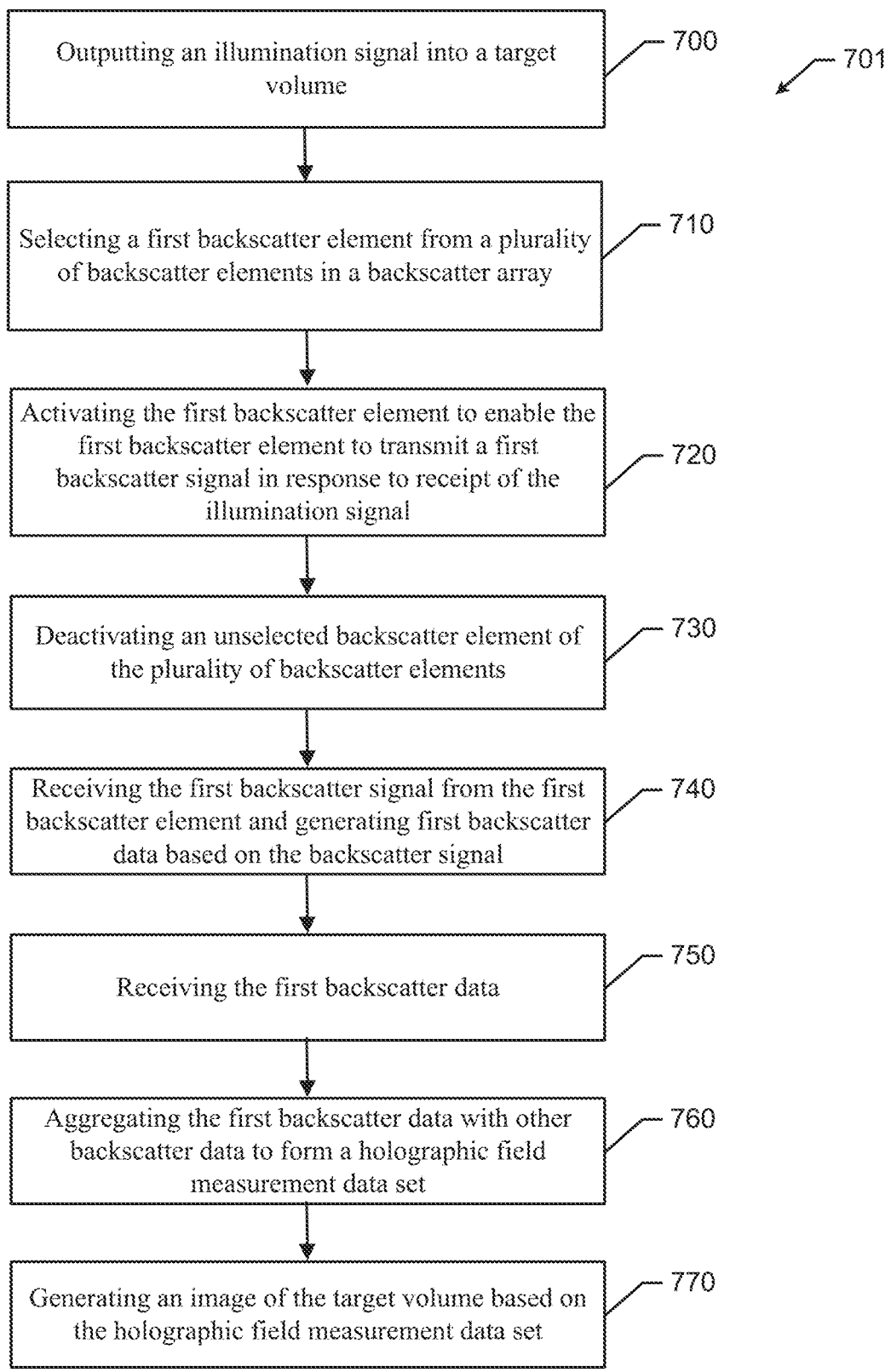
FIG. 7 illustrates a flowchart of an example method for generating a holographic field measurement data set and determining image features according to some example embodiments.

Referring now to FIG. 7, a flowchart of an example method 701 for generating a holographic field measurement data set and determining image features is provided. The example method 701 may comprise, at 700, outputting an illumination signal into a target volume. In this regard, a frequency of the illumination signal may be a radio frequency. The example method 701 may further comprise, at 710, selecting a first backscatter element from a plurality of backscatter elements in a backscatter array. According to some example embodiments, the selected backscatter element may be one of a set or plurality of selected backscatter elements. According to some example embodiments, the backscatter elements may be positioned along a boundary of the target volume. Further, at 720, the example method 701 may comprise activating the first backscatter element to enable the first backscatter element to transmit a first backscatter signal in response to receipt of the illumination signal, and, at 730, deactivating an unselected backscatter element of the plurality of backscatter elements. According to some example embodiments, the unselected backscatter element may be one of a set or plurality of unselected backscatter elements. At 740, the example method 701 may comprise receiving the first backscatter signal from the first backscatter element and generating first backscatter data based on the backscatter signal.

According to some example embodiments, the example method 701 may also comprise, at 750, receiving the first backscatter data, and, at 760, aggregating the first backscatter data with other backscatter data to form a holographic field measurement data set. Further, at 770, the example method 701 may comprise generating an image of the target volume based on the holographic field measurement data set.

According to some example embodiments, the example method 701 may also comprise, prior to generating the image at 770, selecting a second backscatter element from the plurality of backscatter elements. In this regard, the selection of the second backscatter element may include not selecting the first backscatter element. Further in this regard, the example method 701 may comprise activating the second selected backscatter element to enable the second backscatter element to transmit a second backscatter signal in response to receipt of the illumination signal, and deactivating unselected backscatter elements including the first backscatter element. Additionally, the example method 701 may comprise receiving the second backscatter signal from the second backscatter element.

According to some example embodiments, the example method 701 may further comprise receiving a second transmission of the second backscatter signal and converting the second transmission of the second backscatter signal into second backscatter data. Additionally, the aggregating may comprise aggregating the first backscatter data with the second backscatter data to form the holographic field measurement data set. Further, the example method 701 may comprise generating the image of the target volume based on the holographic field measurement data set that includes the aggregation of the first backscatter data with the second backscatter data.

Additionally, according to some example embodiments, converting the first transmission of the first backscatter signal may comprise converting the first transmission of the first backscatter signal into the first backscatter data, where the first backscatter data may be indicative of amplitude and phase of the first backscatter signal. Additionally or alternatively, according to some example embodiments, selecting the first backscatter element may comprise selecting the first backscatter element based on a pseudorandom selection procedure. According to some example embodiments, activating a selected backscatter element (e.g., the first backscatter element or the second backscatter element) may comprise activating the selected backscatter element (e.g., the first backscatter element) for a first time slot and selecting a subsequent backscatter element (e.g., a second backscatter element) for activation during a second time slot. Additionally or alternatively, activating the first backscatter element may include providing a modulation signal to the first backscatter element for use in generating the backscatter signal. Additionally or alternatively, activating a backscatter element may comprise activating the backscatter element via a row and column connection structure. Additionally, according to some example embodiments, the example method 701 may also comprise generating a security screening alert based on the image features of the object.

As mentioned above, the holographic field measurement data set may include a vast amount of data that, according to some example embodiments, must be analyzed quickly to support video frame rates and near-real time imaging of the target volume 170. In this regard, for example, a typical public venue ingress area might be 10 meters by 10 meters by 2.5 meters, thus having a relatively large volume. A useful resolution for a security screening system may be about 12.5 cubic centimeters, which may be achieved by leveraging data points spaced at 2.5 centimeters. To implement such a system may require the use of over 32 million half wavelength spaced points (e.g., backscatter elements or other sensor antennas) and associated data. Based on such an example system and the desire for video frame rates, techniques may be employed as described herein, for example, by the image processor 130, to reduce the processing resources required to generate an image from the holographic field measurement data set. After obtaining the holographic field measurement data set, a prioritization process may be undertaken to target the data that is most interesting, according to some example embodiments.

According to some example embodiments, a prioritization method and associated apparatuses configured to perform the method may be implemented to improve the efficiency of generating an image based a holographic field measurement data set. In this regard, the holographic field measurement data set may be generated, according to some example embodiments, in any fashion using any holographic imaging system. The holographic sensor system 100 may be one example of a system that may be used to generate a holographic field measurement data set, but other systems may be used that also leverage an array of sensors, such as an array of antenna sensors. In addition to prioritizing analysis on portions of the target volume 170 that are likely to be most interesting or valuable first, according to some example embodiments, projection operators and aggregations of the projection operators may be predetermined and organized into a tree structure to facilitate increased efficiency for generating an image based on the holographic field measurement data. Using these techniques, the computations that may be required to generate an image from the holographic field measurement data sets that are being continuously captured and provided can be reduced and simplified, thereby improving the performance of image processing and supporting near-real time rendering of video frame rates. Additionally, while example embodiments of the prioritization approach provided herein are described in the context of data sets based on radio frequency holography, the approach may also be applied to data sets collected using other types of holography, such as, for example, acoustic holography.

In this regard, based on a desired resolution, a plurality of points in space may be defined within the target volume 170. For example, the points may be organized in a three-dimensional grid and have a defined density. For each defined point within the target volume 170, back projection operators (or projection operators) may be calculated based on an architecture of a sensor array (e.g., backscatter array 150 or an array of antennas) used to capture the holographic field measurement data set and the spatial relationships between each point and the elements of the sensor array. The projection operators may, according to some example embodiments, be defined based on a retracement or back projection of the wave from a particular sensor element of a sensor array with respect to the defined point and a source (e.g., the illuminator 110). Since these projection operators are a function the architecture of the sensor array and the spatial relationship between the sensor array and the target volume 170, the projection operators may be determined in advance of any holographic field measurement data set capturing by the sensor array. As such, determination of the projection operators may be performed as part of a setup operation, and therefore do not need to be determined at runtime, when holographic field measurement data set is being captured and provided for analysis.

Figure 8:
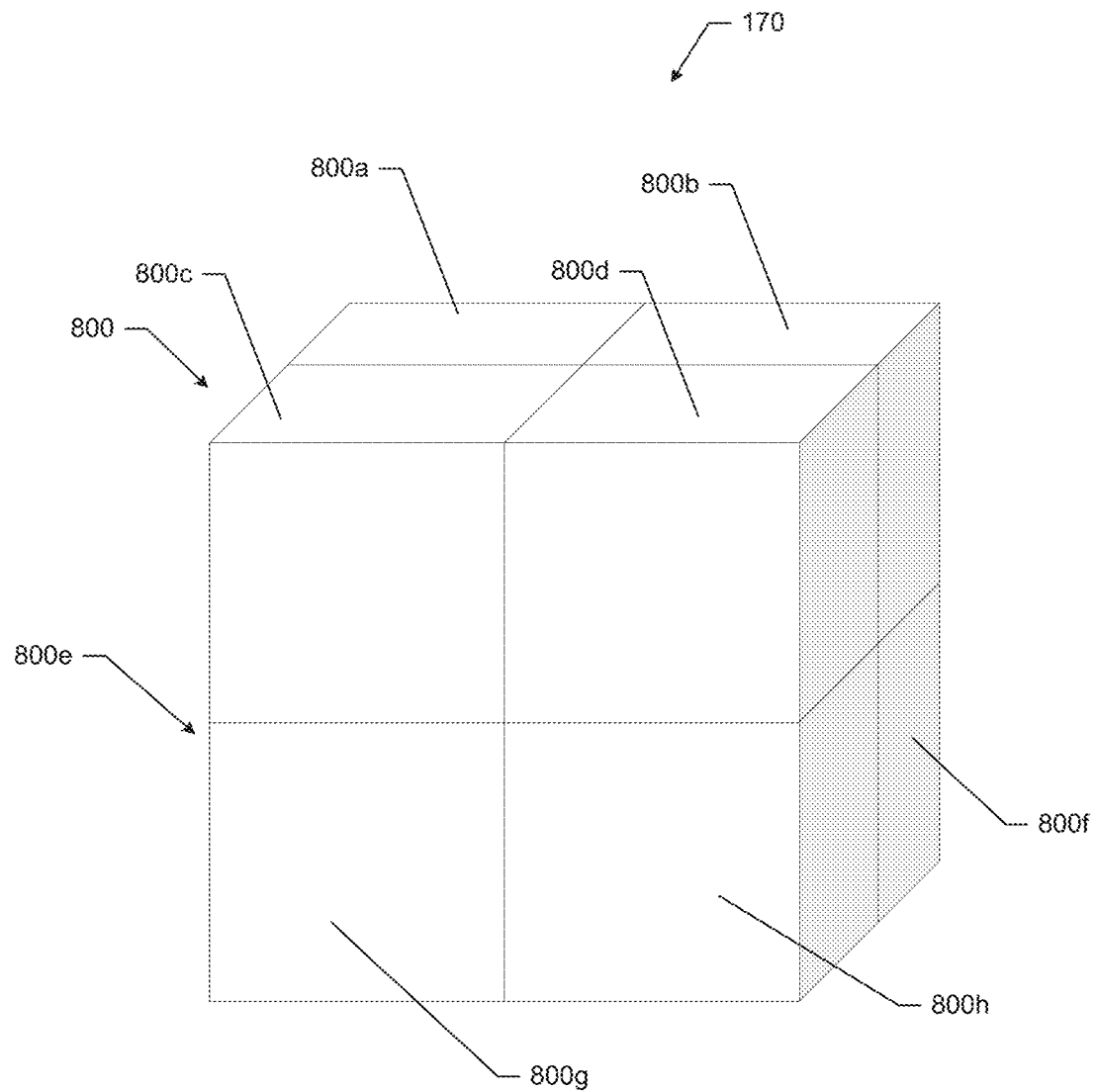
FIG. 8 illustrates a decomposed visualization of a target volume according to some example embodiments.

Additionally, based on a decomposition scheme, the target volume 170 may be decomposed or divided into sub-volumes, where each sub-volume defines a portion of the target volume 170. In this regard, for example, as shown in FIG. 8, a simplified visualization of the target volume 170 is provided as a cubic space being decomposed into sub-volumes. For example, if an octree decomposition approach is used, according to some example embodiments, then the target volume 170 may be segmented into eight sub-volumes 800, namely, sub-volumes 800a to 800h. Again, for simplification the sub-volumes 800 are illustrated as equally sized, cubic volumes, but other sized and shaped decompositions may be used depending on the approach. Additionally, although not shown, each sub-volume 800 may be further decomposed into lower-tier sub-volumes. In this regard, each sub-volume 800 may be decomposed into eight lower-tier sub-volumes. According to some example embodiments, further levels of sub-volumes may also be defined until a sub-volume size is reached that is a minimum desired size for a particular application. The decomposition of the sub-volumes in this manner may formed into a tree-structure that defines the relationships between the various levels of defined sub-volumes.

Since each sub-volume (regardless of the level of the sub-volume) defines a volume in space within the target volume 170, each sub-volume may have points, as described above, that are located within the sub-volumes. As such, the points within a given sub-volume may be associated with the sub-volume. Additionally, the projection operators for the points within a sub-volume may also be associated with the sub-volume. As such, a group or collection of projection operators may be associated with each sub-volume, regardless of the level of the sub-volume on the tree structure. For each sub-volume, the group of projection operators, as linear operators, may be organized into a matrix (e.g., an M×N matrix, where M is there number of points in the sub-volume and N is the number of sensor elements in the sensor array).

According to some example embodiments, as a preliminary operation (i.e., prior to receiving regular holographic field measurement data set, the group of projection operators for the sub-volumes may be aggregated into a combined operator for the sub-volume, which may be referred to as the point aggregation operator for the sub-volume. In this regard, according to some example embodiments, the group of projection operators may be subjected to a linear operation to perform an aggregation to generate the point aggregation operator. For example, the group of projection operators for the sub-volume may be averaged or summed to generate the point aggregation operator for the sub-volume. Because a linear operation may be used to aggregate or combine the projection operators for the sub-volume, the resultant matrix that describes the point aggregation operator may be reduced to a one dimensional matrix (e.g., an 1×N matrix). According to some example embodiments, a weighting, for example in the form of a windowing function, may be applied, based on, for example, a spatial location of the sub-volume. In this regard, sub-volumes that may be located central to the target volume 170 or sub-volumes that are spatially associated with, for example, high foot traffic areas, may be applied a higher weighting over sub-volumes along, for example, a periphery of the target volume 170 were no or little foot traffic occurs. In association with the sub-volumes, the point aggregation operators may be organized in a tree structure, such as an octree structure.

The generation of the point aggregation operators for the sub-volumes may prepare the system for receipt and analysis of the holographic field measurement data set. However, in some instances, for example, due to the memory requirements for storing the point aggregation operators for all possible sub-volumes, according to some example embodiments, point aggregation operators may be determined for only some sub-volumes, such as those that are located in high interest locations within the target volume 170. As such, in situations where the point aggregation operator may be needed for a given sub-volume, as further described below, the point aggregation operator may be determined at runtime when holographic field measurement data set is be captured and analyzed.

In this regard, when holographic field measurement data set is received, the data can be applied to point aggregation operators for the first or top-tier sub-volumes. As a linear operation, the results of the application of the holographic field measurement data set to the point aggregation operator for each sub-volume may be a value, such as a complex number. As such, upon application of the holographic field measurement data set to each point aggregation operator, a value referred to as the sub-volume interest value for each top-tier sub-volumes may be determined. Additionally, because the determination of the sub-volume interest value may be a linear operation, the processing resources utilized to generate the sub-volume interest value may be minimal, in particular, relative to performing a conventional back-projection analysis for the points in the sub-volume.

A magnitude of the sub-volume interest value may be indicative of the quantity of interesting data located within the associated sub-volume of the target volume 170. For example, sub-volumes that contain large metal objects located therein may return a higher magnitude sub-volume interest value than a sub-volume that is empty or includes no metal or dielectric objects. Accordingly, the sub-volume with the highest sub-volume interest value may be of the most interest and processing may be initially focused on this sub-volume.

According to some example embodiments, the sub-volumes may be organized or pushed onto a stack based on their respective sub-volume interest value. In this regard, for a first-in, last-out stack, the sub-volume with the lowest sub-volume interest value may be pushed onto the stack first, followed by the sub-volume with the second lowest sub-volume interest value, and so on until the sub-volume with the highest sub-volume interest value is pushed on the stack last. As such, the sub-volumes may be organized for highest sub-volume interest value to lowest sub-volume interest value, so that the sub-volume with the highest sub-volume interest value is analyzed first and then subsequent analyses are performed in decreasing order of sub-volume interest values. Additionally or alternatively, sub-volumes with sub-volume interest values that do not satisfy an elimination threshold may be discarded for including too little information of interest and no further analysis of these discarded sub-volumes may be undertaken.

Regardless of the manner in which the sub-volumes are organized based on the sub-volume interest values, the sub-volume with the highest sub-volume interest value may be the first sub-volume that is subjected to further analysis. In this regard, moving to a next lower level or tier on the tree structure for the sub-volume with the highest sub-volume interest value, a number (e.g., eight) leaves may be defined that are associated with point aggregation operators for the lower-tier sub-volumes that make up the sub-volume with the highest sub-volume interest value. As such, similar to the process above, the holographic field measurement data set may be applied to the lower-tier point aggregation operators to generate lower-tier sub-volume interest values for the lower-tier sub-volumes. Again, these lower-tier sub-volumes may be organized based on the lower-tier sub-volume interest values and the lower-tier sub-volume with the highest sub-volume interest value may be further decomposed and analyzed at the next level in the tree structure. This process may continue until the size of the next level of sub-volumes is less than a defined minimum size.

Upon completion of the tree-structure analysis of the sub-volume with the highest sub-volume interest value, the sub-volume with the second highest sub-volume interest value may be analyzed to generate sub-volume interest values in the same manner. Each of the sub-volumes with the next highest sub-volume interest values may be subsequently analyzed in a similar manner. The process may continue, for example, via analysis of a next sub-volume on the stack or until a timer expires. Such a timer may be set based on the timing required to provide, for example, video frame rates. In this regard, the timer may be set for long enough to assume that any sub-volumes with data of sufficient interest have been sufficiently analyzed when the timer expires.

Additionally, according to some example embodiments, the process of moving to a next lower level of the tree structure for analysis of smaller sub-volumes may be halted for a sub-volume if the sub-volume interest value is higher than a projection threshold value. In this regard, according to some example embodiments, a sub-volume may be determined by the sub-volume interest value to have such as large amount of interesting data that further lower level analysis of the sub-volume may result in low value processing that may be more resource intensive than performing back projection imaging for the sub-volume. In such instances, performing back projection imaging with respect to the sub-volume having sub-volume interest value that exceeds the projection threshold value may, according to some example embodiments, consume less processing resources than determining lower-tier sub-volume interest values. As such, the projection threshold may be set at a level where such a condition may exist.

Having generated the sub-volume interest values for a sub-volumes at the lowest levels of the tree structure, an image may be rendered based on the sub-volume interest values. In this regard, the lowest level sub-volumes may be used as voxels (three dimensional pixels) within a rendering of an image of the target volume 170. For example, a binary rendering threshold may be applied. In this regard, if the sub-volume interest value is greater than a coloring threshold, an object of interest may be located in the sub-volume and the rendered voxel associated with the sub-volume may be colored a first color (e.g., red). If, however, if the sub-volume interest value is less than a coloring threshold, an object of interest may not be located in the sub-volume and the voxel associated with the sub-volume may be colored a second color (e.g., white or transparent).

Figure 9:
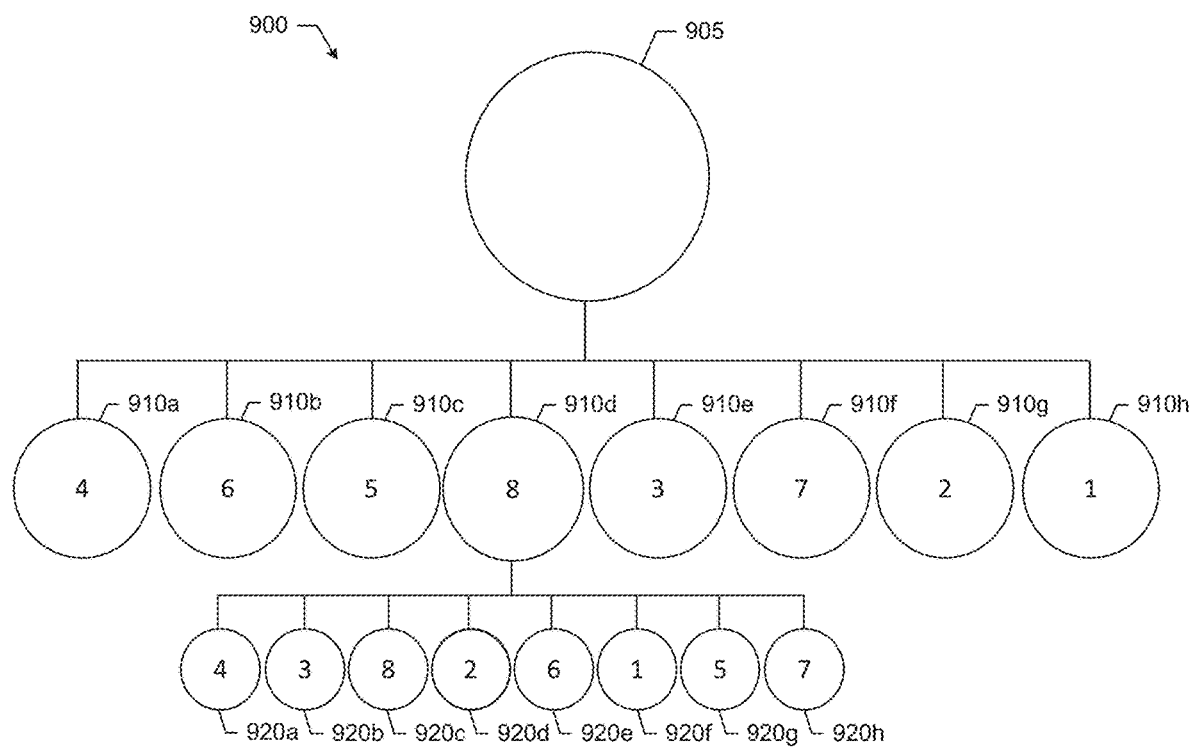
FIG. 9 illustrates a tree structure that is representative of an example scenario of a prioritization process according to some example embodiments.

In view of the above, FIG. 9 illustrates an example tree structure 900 that is representative of an example scenario for the prioritization process described above. In this regard, the circles are representative of some of the defined sub-volumes. The circle 905 may be representative of the entire target volume 170. Further, circles 910a to 910h may be representative of the top-tier sub-volumes that make up the target volume 170 (and may correspond to the sub-volumes defined in FIG. 8, i.e., sub-volumes 800a to 800h). The circles 910a to 910h have an associated value shown in each circle that is representative of an example sub-volume interest value for the respective sub-volume. The sub-volume interest value may be determined based on the predetermined point aggregation operator for each sub-volume as described above. In this regard, it can be seen that circle 910d has the highest sub-volume interest value, i.e., 8, and therefore further analysis of the sub-volume associated with circle 910d may be initially undertaken since that sub-volume is most likely to have interesting data. As shown, in FIG. 9, a lower-tier or level of sub-volumes for the sub-volume associated with circle 910d are shown. Again, sub-volume interest values for these lower-tier sub-volumes can be determined based on the respective point aggregation operators for the lower-tier sub-volumes. In this regard, the sub-volume associated with circle 920c has the highest sub-volume interest value. However, in the example scenario of FIG. 9, a minimum sized sub-volume has been reached (e.g., fifty centimeters cubed), and therefore no further analysis of the lower-tier sub-volumes 920a to 920h are performed. Subsequently, decomposition may be performed with respect to sub-volume associated with circle 910f as the top-tier sub-volume with the second highest sub-volume interest value. As such, lower-tier sub-volume interest values may be determined for the lower-tier sub-volumes of sub-volume represented by circle 910f. The process may continue for each of the top tier sub-volumes in order from highest to lowest sub-volume interest value until all the lower-tier sub-volume interest values are determined or a time out occurs. Subsequently, the lower-tier sub-volumes may be rendered in an image based on the lower-tier sub-volume interest values that have been determined.

According to some example embodiments, since back projection and generating the sub-volume values via averaging may be linear operations, a matrix of projection operators, as described above, may be formed for back projection and generation of the sub-volume interest values. The determination of the sub-volume interest values may be realized as a convolution in space, or as multiplication or windowing operation on, for example, the sensor array. Convolution in space may be computationally expensive, but because the projection matrices can be pre-calculated and stored for use at runtime, the effect on video frame rates and near-real time operation may not be affected. In this regard, use of the point aggregation operators allows for the imaging operations to be a series of efficient matrix-vector multiplications. As another option, filtering by windowing with respect to the array may be more computationally efficient, in some instances, than convolution but less than matrix-vector multiplication. In this regard, windowing and back-projection imaging may be accomplished in near-real time, thereby eliminating the need for large amounts of memory. However, according to some example embodiments, the calculations for windowing and back-projection may involve relatively processing expensive square-roots and complex exponentials. Both approaches may depend on the sparsity the sub-volume being imaged. As the sub-volume becomes more densely filled, according to some example embodiments, the tree-structure (e.g., octree) overhead may become burdensome (relative to a bruit force back projection), and therefore implementation of the projection threshold at each level of the tree may become useful with respect to minimizing the processing overhead. In this regard, if projection threshold is exceeded, as described above, back projection of the full sub-volume may be performed, even if the minimum sized sub-volume has not been reached. The predetermination of the projection operators and the point aggregation operators, can therefore improve the efficiency of the processing systems to provide near-real time video frame rate outputs, since, for example, the point aggregation operators can be organized in a tree structure stored in advance, locally to the image processor 130 for rapid retrieval and use. According to some example embodiments, as mentioned above, memory limitations may, in some instances, cause storage of all point aggregation operators for all sub-volumes of the target volume 170 to be impractical. If a point aggregation operator for a sub-volume has not been predetermined then determination of the projection operators and the point aggregation operators, for the sub-volume that do not have predetermined point aggregation operators, can be determined after the holographic field measurement data set is received.

Having described the approach in a general sense, imaging using a pre-calculated projection octree can now be described in further detail in the context of an example. In this regard, a three-dimensional image of an approximate reflection coefficient at time t, $\Re(t)$, can be calculated by applying a reflection coefficient operator, R, to a vector of measurements Q(t), thereby providing $\Re(t)=RQ(t)$. The reflection coefficient operator may be constructed using the Born approximation with simple Huygens back projection, for example, as provided in D. M. Sheen, D. L. McMakin, T. E. Hall, "Three-dimensional millimeter-wave imaging for concealed weapon detection", IEEE Trans. Microw. Theory Tech., vol. 49, no. 9, pp. 1581-1592, September 2001, which is herein incorporated by reference in its entirety. The images considered in this example may be three-dimensional images over a regular three-dimensional grid representative of the target volume. The sampling of the grid may be determined by the Nyquist rate of the holographic sensor system.

Figures 10A, 10B:
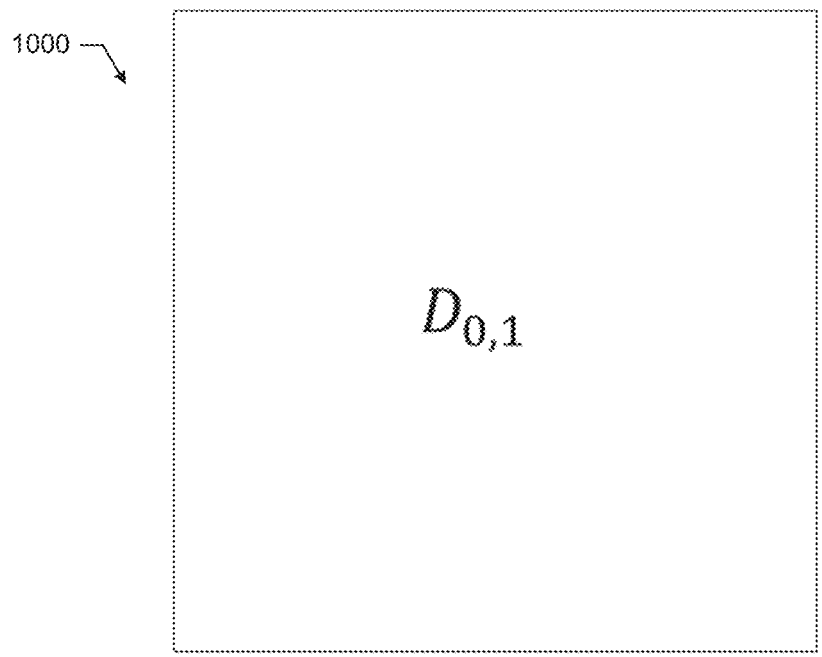
FIG. 10A illustrates an example a target area according to some example embodiments.
FIG. 10B illustrates an example back projection operator structure that corresponds to the target area of FIG. 10A according to some example embodiments.

According to some example embodiments, a prioritization process using the octree decomposition approach can efficiently determine volumes of interest without fully reconstructing the entire target volume as mentioned above. The projection operators used for determining the point aggregation operators may, according to some example embodiments, be the product of a sequence of projections of three-dimensional wavelet transforms and the reflection coefficient operator for a particular sub-volume of the grid. As such, the operators may produce filtered and down-sampled reflection coefficient images. In this regard, FIGS. 10A and 10B illustrate two-dimensional representations of a target space and projection operators in an implementation where the projection operators are separately considered. Referring to FIG. 10A, the target area 1000 (as opposed to a target volume) is represented in association with its identifier D. FIG. 10B shows an example octree decomposition 1010 of the target area in association with respective projection operators that correspond to the data set D, with the respective operators being $p_1$ to $p_{64}$.

Figures 10C, 10D:
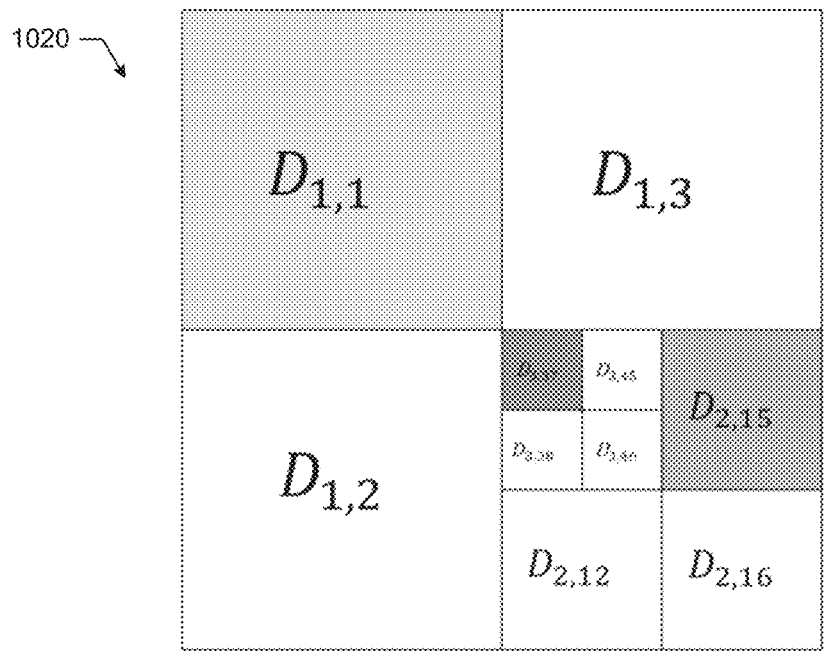
FIG. 10C illustrates an example decomposed sub-areas of the target area of FIG. 10A after a prioritization process according to some example embodiments.
FIG. 10D illustrates the example back projection operator structure of FIG. 10B indicating the back projection operators that map to the sub-areas of interest of FIG. 10C according to some example embodiments.
Figure 10E:
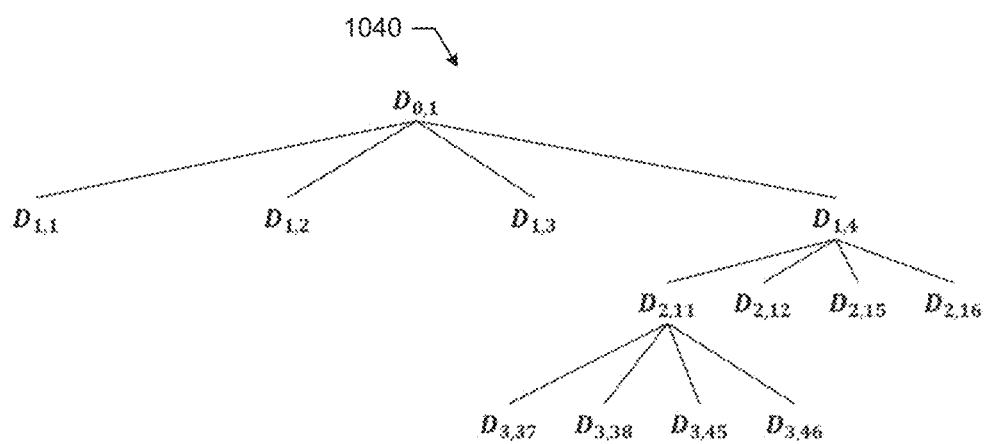
FIG. 10E illustrates a tree structure of analyzed sub-areas of FIG. 10C according to some example embodiments.

In the example scenario, as shown in FIGS. 10C and 10D, the sub-volumes, here sub-areas $D_{1,1}$, $D_{3,37}$, and $D_{2,15}$ of D, have been determined to have data of interest as provided by the darkened areas in the decomposed target area 1020. Accordingly, the mapped projection operators shown in the mapped octree decomposition 1030 may be applied, as indicated by the darkened areas that are spatially mapped to the same areas in the decomposed target area 1020 of FIG. 10C. In this regard, for the sub-area $D_{1,1}$, projection operators $p_1$ to $p_4$, $p_9$ to $p_{12}$, $p_{17}$ to $p_{20}$, and $p_{25}$ to $p_{28}$ may be utilized. For the sub-area $D_{3,27}$, projection operator $p_{37}$ may be utilized, and for data set $D_{2,15}$, projection operators $p_{53}$, $p_{54}$, $p_{61}$, and $p_{62}$ may be utilized. Further, with respect to the structure, FIG. 10E shows the tree structure 1040 of the sub-areas of D that were analyzed during the process.

Figure 11:
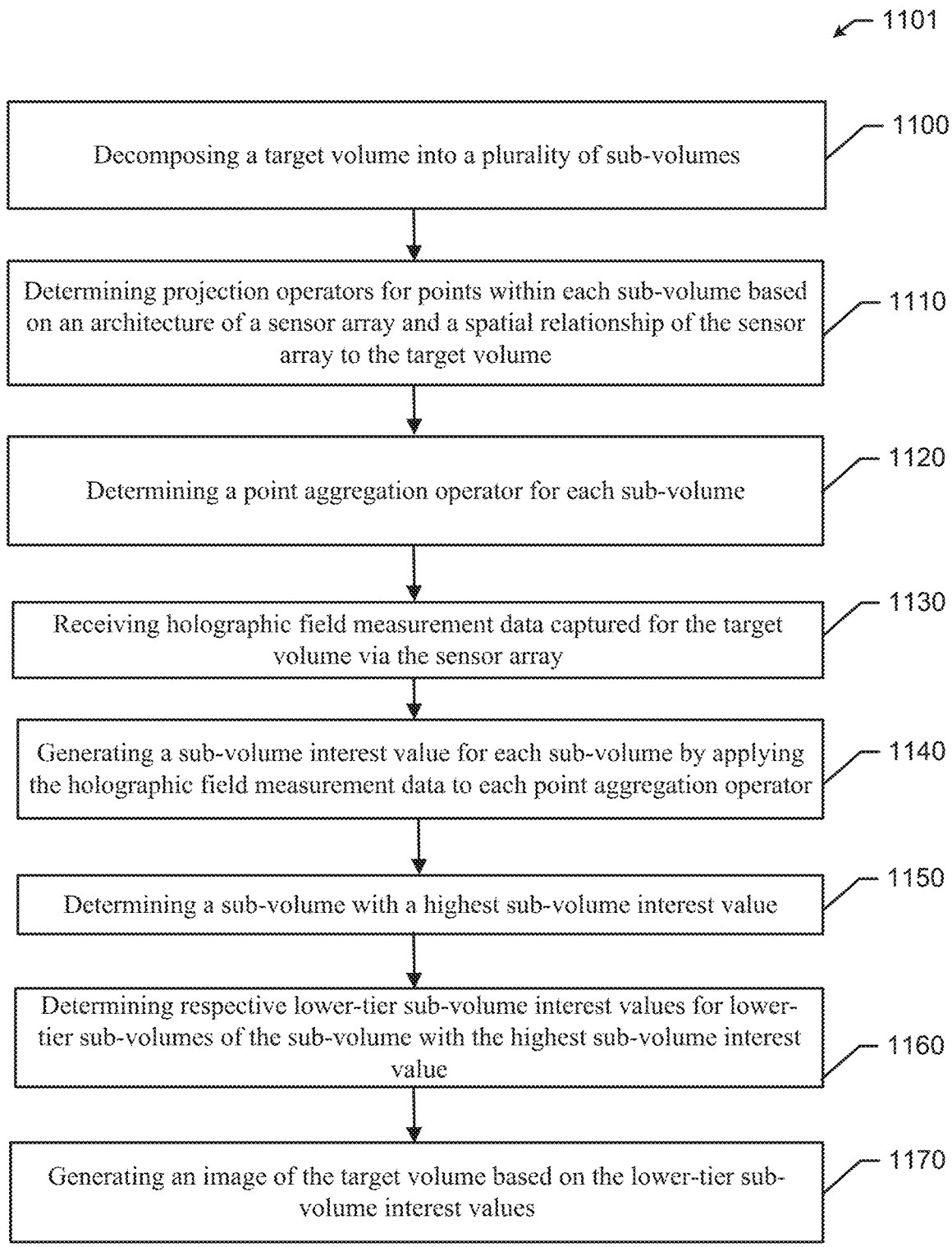
FIG. 11 illustrates a flowchart of an example method for large volume holographic imaging according to some example embodiments.

In view of foregoing and now referring to FIG. 11, an example method 1101 for large volume holographic imaging is provided. The example method 1101 may be performed, for example, by the image processor 130 via the processing circuitry 505. In this regard, the example method 1101 may comprise, at 1100, decomposing a target volume into a plurality of sub-volumes, and, at 1110, determining projection operators for points within each sub-volume based on an architecture of a sensor array and a spatial relationship of the sensor array to the target volume. Additionally, the example method 1101 may also comprise determining a point aggregation operator for each sub-volume at 1120. In this regard, the point aggregation operator may be an aggregation of the projection operators associated with a respective sub-volume. Also, at 1130, the example method 1101 may also comprise receiving holographic field measurement data set captured for the target volume via the sensor array, and, at 1140, generating a sub-volume interest value for each sub-volume by applying the holographic field measurement data set to each point aggregation operator. Further, at 1150, the example method 1101 may comprise determining a sub-volume with a highest sub-volume interest value, and, at 1160, determining respective lower-tier sub-volume interest values for lower-tier sub-volumes of the sub-volume with the highest sub-volume interest value. In this regard, the lower-tier sub-volumes may be defined by decomposing the sub-volume with the highest sub-volume interest value. Additionally, at 1170, the example method 1101 may comprise generating an image of the target volume based on the lower-tier sub-volume interest values.

Additionally, according to some example embodiments, the example method 1101 may further comprise ordering the sub-volumes in a stack. In this regard, the sub-volume with the highest sub-volume interest value may be first in the stack and a sub-volume with a lowest sub-volume interest value may be last in the stack. Additionally or alternatively, according to some example embodiments, the example method 1101 may further comprise discarding from further analysis sub-volumes associated with sub-volume interest values that do not satisfy an elimination threshold. Additionally or alternatively, according to some example embodiments, generating the image of the target volume based on the lower-tier sub-volume interest values may comprise rendering a voxel representation of the lower-tier sub-volumes based on the respective lower-tier sub-volume interest values. Additionally or alternatively, according to some example embodiments, determining the point aggregation operators may comprise, for each sub-volume, averaging or summing the projection operators for the points within the sub-volume. Additionally or alternatively, according to some example embodiments, the example method 1101 may further comprise determining a lower-tier point aggregation operator for at least one lower-tier sub-volume prior to receiving the holographic field measurement data set. Additionally or alternatively, according to some example embodiments, the example method 1101 may further comprise generating an operator tree structure for the point aggregation operators in association with sub-volumes and the lower-tier point aggregation operators in association with the lower-tier sub-volumes. Additionally or alternatively, according to some example embodiments, the target volume and the sub-volumes may be decomposed via an octree decomposition. Additionally or alternatively, according to some example embodiments, the example method 1101 may further comprise generating a security alert for security personnel based on the generated image.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method for large volume holographic imaging, the method comprising:
   decomposing, by processing circuitry, a target volume into a plurality of sub-volumes;
   determining, by the processing circuitry, projection operators for points within each sub-volume based on an architecture of a sensor array and a spatial relationship of the sensor array to the target volume;
   determining, by the processing circuitry, a point aggregation operator for each sub-volume, the point aggregation operator being an aggregation of the projection operators associated with a respective sub-volume;
   receiving, by the processing circuitry, a holographic field measurement data set captured for the target volume via the sensor array;
   generating, by the processing circuitry, a sub-volume interest value for each sub-volume by applying the holographic field measurement data set to each point aggregation operator;
   determining, by the processing circuitry, a sub-volume with a highest sub-volume interest value;
   determining, by the processing circuitry, respective lower-tier sub-volume interest values for lower-tier sub-volumes of the sub-volume with the highest sub-volume interest value, the lower-tier sub-volumes being defined by decomposing the sub-volume with the highest sub-volume interest value; and
   generating, by the processing circuitry, an image of the target volume based on the lower-tier sub-volume interest values.

2. The method of claim 1, further comprising ordering the sub-volumes in a stack, wherein the sub-volume with the highest sub-volume interest value is first in the stack and a sub-volume with a lowest sub-volume interest value is last in the stack.

3. The method of claim 1, further comprising discarding from further analysis sub-volumes associated with sub-volume interest values that do not satisfy an elimination threshold.

4. The method of claim 1, wherein generating the image of the target volume based on the lower-tier sub-volume interest values comprises rendering a voxel representation of the lower-tier sub-volumes based on the respective lower-tier sub-volume interest values.

5. The method of claim 1, wherein determining the point aggregation operators comprises, for each sub-volume, averaging or summing the projection operators for the points within the sub-volume.

6. The method of claim 1, further comprising determining a lower-tier point aggregation operator for at least one lower-tier sub-volume prior to receiving the holographic field measurement data set.

7. The method of claim 6, further comprising generating an operator tree structure for the point aggregation operators in association with sub-volumes and the lower-tier point aggregation operators in association with the lower-tier sub-volumes.

8. The method of claim 7, wherein the target volume and the sub-volumes are decomposed via an octree decomposition.

9. The method of claim 1, further comprising generating a security alert for security personnel based on the generated image.

10. An apparatus for large volume holographic imaging, the apparatus comprising processing circuitry configured to:
    decompose a target volume into a plurality of sub-volumes;
    determine projection operators for points within each sub-volume based on an architecture of a sensor array and a spatial relationship of the sensor array to the target volume;
    determine a point aggregation operator for each sub-volume, each point aggregation operator being an aggregation of the projection operators associated with a respective sub-volume;
    receive holographic field measurement data set captured for the target volume via the sensor array;
    generate a sub-volume interest value for each sub-volume by applying the holographic field measurement data set to each point aggregation operator;
    determine a sub-volume with a highest sub-volume interest value;
    determine respective lower-tier sub-volume interest values for lower-tier sub-volumes of the sub-volume with the highest sub-volume interest value, the lower-tier sub-volumes being defined by decomposing the sub-volume with the highest sub-volume interest value; and
    generate an image of the target volume based on the lower-tier sub-volume interest values.

11. The apparatus of claim 10, wherein the processing circuitry is further configured to order the sub-volumes in a stack, wherein the sub-volume with the highest sub-volume interest value is ordered first in the stack and a sub-volume with a lowest sub-volume interest value is ordered last in the stack.

12. The apparatus of claim 10, wherein the processing circuitry is further configured to discard from further analysis sub-volumes associated with sub-volume interest values that do not satisfy an elimination threshold.

13. The apparatus of claim 10, wherein the processing circuitry configured to generate the image of the target volume based on the lower-tier sub-volume interest values includes being configured to render a voxel representation of the lower-tier sub-volumes based on the respective lower-tier sub-volume interest values.

14. The apparatus of claim 10, wherein the processing circuitry configured to determine the point aggregation operators includes being configured to, for each sub-volume, average or sum the projection operators for the points within the sub-volume.

15. The apparatus of claim 10, wherein the processing circuitry is further configured to determine a lower-tier point aggregation operator for at least one lower-tier sub-volume prior to receiving the holographic field measurement data set.

16. The apparatus of claim 15, wherein the processing circuitry is further configured to generate an operator tree structure for the point aggregation operators in association with sub-volumes and the lower-tier point aggregation operators in association with the lower-tier sub-volumes.

17. The apparatus of claim 16, wherein the processing circuitry is further configured to decompose the target volume and the sub-volumes via an octree decomposition.

18. A holography imaging system comprising:
    a holography sensor comprising a sensor array, the holography sensor configured to capture holographic field measurement data set of a target volume; and
    processing circuitry configured to:
    decompose the target volume into a plurality of sub-volumes;

determine projection operators for points within each sub-volume based on an architecture of the sensor array and a spatial relationship of the sensor array to the target volume;

determine a point aggregation operator for each sub-volume, each point aggregation operator being an aggregation of the projection operators associated with a respective sub-volume;

receive the holographic field measurement data set captured for the target volume via the sensor array;

generate a sub-volume interest value for each sub-volume by applying the holographic field measurement data set to each point aggregation operator;

determine a sub-volume with a highest sub-volume interest value;

determine respective lower-tier sub-volume interest values for lower-tier sub-volumes of the sub-volume with the highest sub-volume interest value, the lower-tier sub-volumes being defined by decomposing the sub-volume with the highest sub-volume interest value; and generate an image of the target volume based on the lower-tier sub-volume interest values.

19. The holography imaging system of claim 18, wherein the processing circuitry is further configured to generate an operator tree structure for the point aggregation operators in association with sub-volumes and lower-tier point aggregation operators in association with the lower-tier sub-volumes.

20. The holography imaging system of claim 19, wherein the processing circuitry is further configured to decompose the target volume and the sub-volumes via an octree decomposition.

* * * * *